(12) United States Patent
Wood et al.

(10) Patent No.: US 9,977,809 B2
(45) Date of Patent: May 22, 2018

(54) INFORMATION AND DATA FRAMEWORK IN A CONTENT CENTRIC NETWORK

(71) Applicant: CISCO TECHNOLOGY, INC., San Jose, CA (US)

(72) Inventors: Christopher A. Wood, San Francisco, CA (US); Glenn C. Scott, Portola Valley, CA (US)

(73) Assignee: Cisco Technology, Inc., San Jose, CA (US)

( * ) Notice: Subject to any disclaimer, the term of this patent is extended or adjusted under 35 U.S.C. 154(b) by 212 days.

(21) Appl. No.: 15/052,739

(22) Filed: Feb. 24, 2016

(65) Prior Publication Data

US 2017/0091251 A1   Mar. 30, 2017

Related U.S. Application Data

(60) Provisional application No. 62/232,240, filed on Sep. 24, 2015.

(51) Int. Cl.
*H04L 29/08* (2006.01)
*G06F 17/30* (2006.01)
(Continued)

(52) U.S. Cl.
CPC ........ *G06F 17/30345* (2013.01); *G06F 9/541* (2013.01); *G06F 17/30117* (2013.01);
(Continued)

(58) Field of Classification Search
CPC ........................... H04L 67/10; H04L 67/2842
(Continued)

(56) References Cited

U.S. PATENT DOCUMENTS

| 817,441 A | 4/1906 | Niesz |
| 4,309,569 A | 1/1982 | Merkle |

(Continued)

FOREIGN PATENT DOCUMENTS

| CN | 103873371 | 6/2014 |
| DE | 1720277 A1 | 6/1967 |

(Continued)

OTHER PUBLICATIONS

Marc Mosko: "CCNx 1.0 Protocol Introduction" Apr. 2, 2014 [Retrieved from the Internet Jun. 8, 2016] http://www.ccnx.org/pubs/hhg/1.1%20CCNx%201.0%20Protocol%20Introduction.pdf *paragraphs [01.3], [002], [02.1], [0003].

(Continued)

*Primary Examiner* — Adnan Mirza

(57) ABSTRACT

One embodiment provides a system that facilitates a single interface for file I/O and network communication. During operation, the system receives from a local application a first command to create content. The first command includes a content name and access control information that indicates how the content may be accessed. The content name is a hierarchically structured variable length identifier that includes contiguous name components ordered from a most general level to a most specific level. The system creates a first manifest which is a content object that indicates a set of content objects by a name and a digest. The first manifest name is the content name corresponding to the first command, and access to the manifest is based on the access control information included in the first command. The system transmits to the local application the first manifest and an indicator of success for creating the first manifest.

20 Claims, 10 Drawing Sheets

(51) Int. Cl.
  *G06F 9/54* (2006.01)
  *H04N 21/84* (2011.01)
(52) U.S. Cl.
  CPC .. *G06F 17/30194* (2013.01); *G06F 17/30233* (2013.01); *H04L 67/10* (2013.01); *H04L 67/2842* (2013.01); *H04L 67/327* (2013.01); *H04N 21/84* (2013.01)

(58) Field of Classification Search
  USPC ........................................................ 709/203
  See application file for complete search history.

(56) References Cited

U.S. PATENT DOCUMENTS

| | | |
|---|---|---|
| 4,921,898 A | 5/1990 | Lenney |
| 5,070,134 A | 12/1991 | Oyamada |
| 5,110,856 A | 5/1992 | Oyamada |
| 5,214,702 A | 5/1993 | Fischer |
| 5,377,354 A | 12/1994 | Scannell |
| 5,506,844 A | 4/1996 | Rao |
| 5,629,370 A | 5/1997 | Freidzon |
| 5,845,207 A | 12/1998 | Amin |
| 5,870,605 A | 2/1999 | Bracho |
| 6,021,464 A | 2/2000 | Yao |
| 6,047,331 A | 4/2000 | Medard |
| 6,052,683 A | 4/2000 | Irwin |
| 6,085,320 A | 7/2000 | Kaliski, Jr. |
| 6,091,724 A | 7/2000 | Chandra |
| 6,128,623 A | 10/2000 | Mattis |
| 6,128,627 A | 10/2000 | Mattis |
| 6,173,364 B1 | 1/2001 | Zenchelsky |
| 6,209,003 B1 | 3/2001 | Mattis |
| 6,226,618 B1 | 5/2001 | Downs |
| 6,233,617 B1 | 5/2001 | Rothwein |
| 6,233,646 B1 | 5/2001 | Hahm |
| 6,289,358 B1 | 9/2001 | Mattis |
| 6,292,880 B1 | 9/2001 | Mattis |
| 6,332,158 B1 | 12/2001 | Risley |
| 6,363,067 B1 | 3/2002 | Chung |
| 6,366,988 B1 | 4/2002 | Skiba |
| 6,574,377 B1 | 6/2003 | Cahill |
| 6,654,792 B1 | 11/2003 | Verma |
| 6,667,957 B1 | 12/2003 | Corson |
| 6,681,220 B1 | 1/2004 | Kaplan |
| 6,681,326 B2 | 1/2004 | Son |
| 6,732,273 B1 | 5/2004 | Byers |
| 6,769,066 B1 | 7/2004 | Botros |
| 6,772,333 B1 | 8/2004 | Brendel |
| 6,775,258 B1 | 8/2004 | vanValkenburg |
| 6,834,272 B1 | 12/2004 | Naor |
| 6,862,280 B1 | 3/2005 | Bertagna |
| 6,901,452 B1 | 5/2005 | Bertagna |
| 6,915,307 B1 | 7/2005 | Mattis |
| 6,917,985 B2 | 7/2005 | Madruga |
| 6,957,228 B1 | 10/2005 | Graser |
| 6,968,393 B1 | 11/2005 | Chen |
| 6,981,029 B1 | 12/2005 | Menditto |
| 7,007,024 B2 | 2/2006 | Zelenka |
| 7,013,389 B1 | 3/2006 | Srivastava |
| 7,031,308 B2 | 4/2006 | Garcia-Luna-Aceves |
| 7,043,637 B2 | 5/2006 | Bolosky |
| 7,061,877 B1 | 6/2006 | Gummalla |
| 7,080,073 B1 | 7/2006 | Jiang |
| RE39,360 E | 10/2006 | Aziz |
| 7,149,750 B2 | 12/2006 | Chadwick |
| 7,152,094 B1 | 12/2006 | Jannu |
| 7,177,646 B2 | 2/2007 | ONeill |
| 7,206,860 B2 | 4/2007 | Murakami |
| 7,206,861 B1 | 4/2007 | Callon |
| 7,210,326 B2 | 5/2007 | Kawamoto |
| 7,233,948 B1 | 6/2007 | Shamoon |
| 7,246,159 B2 | 7/2007 | Aggarwal |
| 7,257,837 B2 | 8/2007 | Xu |
| 7,287,275 B2 | 10/2007 | Moskowitz |
| 7,315,541 B1 | 1/2008 | Housel |
| 7,339,929 B2 | 3/2008 | Zelig |
| 7,350,229 B1 | 3/2008 | Lander |
| 7,362,727 B1 | 4/2008 | ONeill |
| 7,382,787 B1 | 6/2008 | Barnes |
| 7,395,507 B2 | 7/2008 | Robarts |
| 7,430,755 B1 | 9/2008 | Hughes |
| 7,444,251 B2 | 10/2008 | Nikovski |
| 7,466,703 B1 | 12/2008 | Arunachalam |
| 7,472,422 B1 | 12/2008 | Agbabian |
| 7,496,668 B2 | 2/2009 | Hawkinson |
| 7,509,425 B1 | 3/2009 | Rosenberg |
| 7,523,016 B1 | 4/2009 | Surdulescu |
| 7,535,926 B1 | 5/2009 | Deshpande |
| 7,542,471 B2 | 6/2009 | Samuels |
| 7,543,064 B2 | 6/2009 | Juncker |
| 7,552,233 B2 | 6/2009 | Raju |
| 7,555,482 B2 | 6/2009 | Korkus |
| 7,555,563 B2 | 6/2009 | Ott |
| 7,564,812 B1 | 7/2009 | Elliott |
| 7,567,547 B2 | 7/2009 | Mosko |
| 7,567,946 B2 | 7/2009 | Andreoli |
| 7,580,971 B1 | 8/2009 | Gollapudi |
| 7,623,535 B2 | 11/2009 | Guichard |
| 7,636,767 B2 | 12/2009 | Lev-Ran |
| 7,647,507 B1 | 1/2010 | Feng |
| 7,660,324 B2 | 2/2010 | Oguchi |
| 7,685,290 B2 | 3/2010 | Satapati |
| 7,698,463 B2 | 4/2010 | Ogier |
| 7,698,559 B1 | 4/2010 | Chaudhury |
| 7,769,887 B1 | 8/2010 | Bhattacharyya |
| 7,779,467 B2 | 8/2010 | Choi |
| 7,801,069 B2 | 9/2010 | Cheung |
| 7,801,177 B2 | 9/2010 | Luss |
| 7,816,441 B2 | 10/2010 | Elizalde |
| 7,831,733 B2 | 11/2010 | Sultan |
| 7,873,619 B1 | 1/2011 | Faibish |
| 7,908,337 B2 | 3/2011 | Garcia-Luna-Aceves |
| 7,924,837 B1 | 4/2011 | Shabtay |
| 7,953,014 B2 | 5/2011 | Toda |
| 7,953,885 B1 | 5/2011 | Devireddy |
| 7,979,912 B1 | 7/2011 | Roka |
| 8,000,267 B2 | 8/2011 | Solis |
| 8,010,691 B2 | 8/2011 | Kollmansberger |
| 8,069,023 B1 | 11/2011 | Frailong |
| 8,074,289 B1 | 12/2011 | Carpentier |
| 8,117,441 B2 | 2/2012 | Kurien |
| 8,160,069 B2 | 4/2012 | Jacobson |
| 8,204,060 B2 | 6/2012 | Jacobson |
| 8,214,364 B2 | 7/2012 | Bigus |
| 8,224,985 B2 | 7/2012 | Takeda |
| 8,225,057 B1 | 7/2012 | Zheng |
| 8,239,331 B2 | 8/2012 | Shanmugavelayutham |
| 8,271,578 B2 | 9/2012 | Sheffi |
| 8,271,687 B2 | 9/2012 | Turner |
| 8,312,064 B1 | 11/2012 | Gauvin |
| 8,332,357 B1 | 12/2012 | Chung |
| 8,375,420 B2 | 2/2013 | Farrell |
| 8,386,622 B2 | 2/2013 | Jacobson |
| 8,447,851 B1 | 5/2013 | Anderson |
| 8,462,781 B2 | 6/2013 | McGhee |
| 8,467,297 B2 | 6/2013 | Liu |
| 8,473,633 B2 | 6/2013 | Eardley |
| 8,553,562 B2 | 10/2013 | Allan |
| 8,572,214 B2 | 10/2013 | Garcia-Luna-Aceves |
| 8,654,649 B2 | 2/2014 | Vasseur |
| 8,665,757 B2 | 3/2014 | Kling |
| 8,667,172 B2 | 3/2014 | Ravindran |
| 8,677,451 B1 | 3/2014 | Bhimaraju |
| 8,688,619 B1 | 4/2014 | Ezick |
| 8,699,350 B1 | 4/2014 | Kumar |
| 8,718,055 B2 | 5/2014 | Vasseur |
| 8,750,820 B2 | 6/2014 | Allan |
| 8,761,022 B2 | 6/2014 | Chiabaut |
| 8,762,477 B2 | 6/2014 | Xie |
| 8,762,570 B2 | 6/2014 | Qian |
| 8,762,707 B2 | 6/2014 | Killian |
| 8,767,627 B2 | 7/2014 | Ezure |
| 8,817,594 B2 | 8/2014 | Gero |

(56) References Cited

U.S. PATENT DOCUMENTS

| | | |
|---|---|---|
| 8,826,381 B2 | 9/2014 | Kim |
| 8,832,302 B1 | 9/2014 | Bradford |
| 8,836,536 B2 | 9/2014 | Marwah |
| 8,861,356 B2 | 10/2014 | Kozat |
| 8,862,774 B2 | 10/2014 | Vasseur |
| 8,868,779 B2 | 10/2014 | ONeill |
| 8,874,842 B1 | 10/2014 | Kimmel |
| 8,880,682 B2 | 11/2014 | Bishop |
| 8,903,756 B2 | 12/2014 | Zhao |
| 8,923,293 B2 | 12/2014 | Jacobson |
| 8,934,496 B2 | 1/2015 | Vasseur |
| 8,937,865 B1 | 1/2015 | Kumar |
| 8,972,969 B2 | 3/2015 | Gaither |
| 8,977,596 B2 | 3/2015 | Montulli |
| 9,002,921 B2 | 4/2015 | Westphal |
| 9,032,095 B1 | 5/2015 | Traina |
| 9,071,498 B2 | 6/2015 | Beser |
| 9,112,895 B1 | 8/2015 | Lin |
| 9,137,152 B2 | 9/2015 | Xie |
| 9,253,087 B2 | 2/2016 | Zhang |
| 9,270,598 B1 | 2/2016 | Oran |
| 9,280,610 B2 | 3/2016 | Gruber |
| 2002/0002680 A1 | 1/2002 | Carbajal |
| 2002/0010795 A1 | 1/2002 | Brown |
| 2002/0038296 A1 | 3/2002 | Margolus |
| 2002/0048269 A1 | 4/2002 | Hong |
| 2002/0054593 A1 | 5/2002 | Morohashi |
| 2002/0077988 A1 | 6/2002 | Sasaki |
| 2002/0078066 A1 | 6/2002 | Robinson |
| 2002/0138551 A1 | 9/2002 | Erickson |
| 2002/0152305 A1 | 10/2002 | Jackson |
| 2002/0176404 A1 | 11/2002 | Girard |
| 2002/0188605 A1 | 12/2002 | Adya |
| 2002/0199014 A1 | 12/2002 | Yang |
| 2003/0004621 A1 | 1/2003 | Bousquet |
| 2003/0009365 A1 | 1/2003 | Tynan |
| 2003/0033394 A1 | 2/2003 | Stine |
| 2003/0046396 A1 | 3/2003 | Richter |
| 2003/0046437 A1 | 3/2003 | Eytchison |
| 2003/0048793 A1 | 3/2003 | Pochon |
| 2003/0051100 A1 | 3/2003 | Patel |
| 2003/0061384 A1 | 3/2003 | Nakatani |
| 2003/0074472 A1 | 4/2003 | Lucco |
| 2003/0088696 A1 | 5/2003 | McCanne |
| 2003/0097447 A1 | 5/2003 | Johnston |
| 2003/0099237 A1 | 5/2003 | Mitra |
| 2003/0046421 A1 | 6/2003 | Horvitz et al. |
| 2003/0140257 A1 | 7/2003 | Peterka |
| 2003/0229892 A1 | 12/2003 | Sardera |
| 2004/0024879 A1 | 2/2004 | Dingman |
| 2004/0030602 A1 | 2/2004 | Rosenquist |
| 2004/0064737 A1 | 4/2004 | Milliken |
| 2004/0071140 A1 | 4/2004 | Jason |
| 2004/0073617 A1 | 4/2004 | Milliken |
| 2004/0073715 A1 | 4/2004 | Folkes |
| 2004/0139230 A1 | 7/2004 | Kim |
| 2004/0196783 A1 | 10/2004 | Shinomiya |
| 2004/0218548 A1 | 11/2004 | Kennedy |
| 2004/0221047 A1 | 11/2004 | Grover |
| 2004/0225627 A1 | 11/2004 | Botros |
| 2004/0233916 A1 | 11/2004 | Takeuchi |
| 2004/0246902 A1 | 12/2004 | Weinstein |
| 2004/0252683 A1 | 12/2004 | Kennedy |
| 2004/0267902 A1 | 12/2004 | Yang |
| 2005/0003832 A1 | 1/2005 | Osafune |
| 2005/0028156 A1 | 2/2005 | Hammond |
| 2005/0043060 A1 | 2/2005 | Brandenberg |
| 2005/0050211 A1 | 3/2005 | Kaul |
| 2005/0066121 A1 | 3/2005 | Keeler |
| 2005/0074001 A1 | 4/2005 | Mattes |
| 2005/0132207 A1 | 6/2005 | Mourad |
| 2005/0149508 A1 | 7/2005 | Deshpande |
| 2005/0159823 A1 | 7/2005 | Hayes |
| 2005/0198351 A1 | 9/2005 | Nog |
| 2005/0249196 A1 | 11/2005 | Ansari |
| 2005/0259637 A1 | 11/2005 | Chu |
| 2005/0262217 A1 | 11/2005 | Nonaka |
| 2005/0281288 A1 | 12/2005 | Banerjee |
| 2005/0286535 A1 | 12/2005 | Shrum |
| 2005/0289222 A1 | 12/2005 | Sahim |
| 2006/0010249 A1 | 1/2006 | Sabesan |
| 2006/0029102 A1 | 2/2006 | Abe |
| 2006/0039379 A1 | 2/2006 | Abe |
| 2006/0051055 A1 | 3/2006 | Ohkawa |
| 2006/0072523 A1 | 4/2006 | Richardson |
| 2006/0099973 A1 | 5/2006 | Nair |
| 2006/0129514 A1 | 6/2006 | Watanabe |
| 2006/0133343 A1 | 6/2006 | Huang |
| 2006/0146686 A1 | 7/2006 | Kim |
| 2006/0173831 A1 | 8/2006 | Basso |
| 2006/0193295 A1 | 8/2006 | White |
| 2006/0203804 A1 | 9/2006 | Whitmore |
| 2006/0206445 A1 | 9/2006 | Andreoli |
| 2006/0215684 A1 | 9/2006 | Capone |
| 2006/0223504 A1 | 10/2006 | Ishak |
| 2006/0242155 A1 | 10/2006 | Moore |
| 2006/0256767 A1 | 11/2006 | Suzuki |
| 2006/0268792 A1 | 11/2006 | Belcea |
| 2006/0288237 A1 | 12/2006 | Goodwill |
| 2007/0019619 A1 | 1/2007 | Foster |
| 2007/0073888 A1 | 3/2007 | Madhok |
| 2007/0094265 A1 | 4/2007 | Korkus |
| 2007/0112880 A1 | 5/2007 | Yang |
| 2007/0124412 A1 | 5/2007 | Narayanaswami |
| 2007/0127457 A1 | 6/2007 | Mirtorabi |
| 2007/0156998 A1 | 7/2007 | Gorobets |
| 2007/0160062 A1 | 7/2007 | Morishita |
| 2007/0162394 A1 | 7/2007 | Zager |
| 2007/0171828 A1 | 7/2007 | Dalal |
| 2007/0189284 A1 | 8/2007 | Kecskemeti |
| 2007/0195765 A1 | 8/2007 | Heissenbuttel |
| 2007/0204011 A1 | 8/2007 | Shaver |
| 2007/0209067 A1 | 9/2007 | Fogel |
| 2007/0239892 A1 | 10/2007 | Ott |
| 2007/0240207 A1 | 10/2007 | Belakhdar |
| 2007/0245034 A1 | 10/2007 | Retana |
| 2007/0253418 A1 | 11/2007 | Shiri |
| 2007/0255677 A1 | 11/2007 | Alexander |
| 2007/0255699 A1 | 11/2007 | Sreenivas |
| 2007/0255781 A1 | 11/2007 | Li |
| 2007/0274504 A1 | 11/2007 | Maes |
| 2007/0275701 A1 | 11/2007 | Jonker |
| 2007/0276907 A1 | 11/2007 | Maes |
| 2007/0283158 A1 | 12/2007 | Danseglio |
| 2007/0294187 A1 | 12/2007 | Scherrer |
| 2008/0005056 A1 | 1/2008 | Stelzig |
| 2008/0005223 A1 | 1/2008 | Flake |
| 2008/0010366 A1 | 1/2008 | Duggan |
| 2008/0037420 A1 | 2/2008 | Tang |
| 2008/0043989 A1 | 2/2008 | Furutono |
| 2008/0046340 A1 | 2/2008 | Brown |
| 2008/0059631 A1 | 3/2008 | Bergstrom |
| 2008/0080440 A1 | 4/2008 | Yarvis |
| 2008/0082662 A1 | 4/2008 | Dandliker |
| 2008/0095159 A1 | 4/2008 | Suzuki |
| 2008/0101357 A1 | 5/2008 | Iovanna |
| 2008/0107034 A1 | 5/2008 | Jetcheva |
| 2008/0107259 A1 | 5/2008 | Satou |
| 2008/0123862 A1 | 5/2008 | Rowley |
| 2008/0133583 A1 | 6/2008 | Artan |
| 2008/0133755 A1 | 6/2008 | Pollack |
| 2008/0151755 A1 | 6/2008 | Nishioka |
| 2008/0159271 A1 | 7/2008 | Kutt |
| 2008/0165775 A1 | 7/2008 | Das |
| 2008/0186901 A1 | 8/2008 | Itagaki |
| 2008/0200153 A1 | 8/2008 | Fitzpatrick |
| 2008/0215669 A1 | 9/2008 | Gaddy |
| 2008/0216086 A1 | 9/2008 | Tanaka |
| 2008/0243992 A1 | 10/2008 | Jardetzky |
| 2008/0250006 A1 | 10/2008 | Dettinger |
| 2008/0256138 A1 | 10/2008 | Sim-Tang |
| 2008/0256359 A1 | 10/2008 | Kahn |
| 2008/0270618 A1 | 10/2008 | Rosenberg |
| 2008/0271143 A1 | 10/2008 | Stephens |

(56) References Cited

U.S. PATENT DOCUMENTS

| | | |
|---|---|---|
| 2008/0287142 A1 | 11/2008 | Keighran |
| 2008/0288580 A1 | 11/2008 | Wang |
| 2008/0291923 A1 | 11/2008 | Back |
| 2008/0298376 A1 | 12/2008 | Takeda |
| 2008/0320148 A1 | 12/2008 | Capuozzo |
| 2009/0006659 A1 | 1/2009 | Collins |
| 2009/0013324 A1 | 1/2009 | Gobara |
| 2009/0022154 A1 | 1/2009 | Kiribe |
| 2009/0024641 A1 | 1/2009 | Quigley |
| 2009/0030978 A1 | 1/2009 | Johnson |
| 2009/0037763 A1 | 2/2009 | Adhya |
| 2009/0052660 A1 | 2/2009 | Chen |
| 2009/0067429 A1 | 3/2009 | Nagai |
| 2009/0077184 A1 | 3/2009 | Brewer |
| 2009/0092043 A1 | 4/2009 | Lapuh |
| 2009/0097631 A1 | 4/2009 | Gisby |
| 2009/0103515 A1 | 4/2009 | Pointer |
| 2009/0113068 A1 | 4/2009 | Fujihira |
| 2009/0116393 A1 | 5/2009 | Hughes |
| 2009/0117922 A1 | 5/2009 | Bell |
| 2009/0132662 A1 | 5/2009 | Sheridan |
| 2009/0135728 A1 | 5/2009 | Shen |
| 2009/0144300 A1 | 6/2009 | Chatley |
| 2009/0157887 A1 | 6/2009 | Froment |
| 2009/0185745 A1 | 7/2009 | Momosaki |
| 2009/0193101 A1 | 7/2009 | Munetsugu |
| 2009/0198832 A1 | 8/2009 | Shah |
| 2009/0222344 A1 | 9/2009 | Greene |
| 2009/0228593 A1 | 9/2009 | Takeda |
| 2009/0254572 A1 | 10/2009 | Redlich |
| 2009/0268905 A1 | 10/2009 | Matsushima |
| 2009/0274158 A1 | 11/2009 | Sharp |
| 2009/0276396 A1 | 11/2009 | Gorman |
| 2009/0285209 A1 | 11/2009 | Stewart |
| 2009/0287835 A1 | 11/2009 | Jacobson |
| 2009/0287853 A1 | 11/2009 | Carson |
| 2009/0288076 A1 | 11/2009 | Johnson |
| 2009/0288143 A1 | 11/2009 | Stebila |
| 2009/0288163 A1 | 11/2009 | Jacobson |
| 2009/0292743 A1 | 11/2009 | Bigus |
| 2009/0293121 A1 | 11/2009 | Bigus |
| 2009/0296719 A1 | 12/2009 | Maier |
| 2009/0300079 A1 | 12/2009 | Shitomi |
| 2009/0300407 A1 | 12/2009 | Kamath |
| 2009/0300512 A1 | 12/2009 | Ahn |
| 2009/0307286 A1 | 12/2009 | Laffin |
| 2009/0307333 A1 | 12/2009 | Welingkar |
| 2009/0323632 A1 | 12/2009 | Nix |
| 2010/0005061 A1 | 1/2010 | Basco |
| 2010/0027539 A1 | 2/2010 | Beverly |
| 2010/0046546 A1 | 2/2010 | Ram |
| 2010/0057929 A1 | 3/2010 | Merat |
| 2010/0058346 A1 | 3/2010 | Narang |
| 2010/0088370 A1 | 4/2010 | Wu |
| 2010/0094767 A1 | 4/2010 | Miltonberger |
| 2010/0094876 A1 | 4/2010 | Huang |
| 2010/0098093 A1 | 4/2010 | Ejzak |
| 2010/0100465 A1 | 4/2010 | Cooke |
| 2010/0103870 A1 | 4/2010 | Garcia-Luna-Aceves |
| 2010/0124191 A1 | 5/2010 | Vos |
| 2010/0125911 A1 | 5/2010 | Bhaskaran |
| 2010/0131660 A1 | 5/2010 | Dec |
| 2010/0150155 A1 | 6/2010 | Napierala |
| 2010/0165976 A1 | 7/2010 | Khan |
| 2010/0169478 A1 | 7/2010 | Saha |
| 2010/0169503 A1 | 7/2010 | Kollmansberger |
| 2010/0180332 A1 | 7/2010 | Ben-Yochanan |
| 2010/0182995 A1 | 7/2010 | Hwang |
| 2010/0185753 A1 | 7/2010 | Liu |
| 2010/0195653 A1 | 8/2010 | Jacobson |
| 2010/0195654 A1 | 8/2010 | Jacobson |
| 2010/0195655 A1 | 8/2010 | Jacobson |
| 2010/0217874 A1 | 8/2010 | Anantharaman |
| 2010/0217985 A1 | 8/2010 | Fahrny |
| 2010/0232402 A1 | 9/2010 | Przybysz |
| 2010/0232439 A1 | 9/2010 | Dham |
| 2010/0235516 A1 | 9/2010 | Nakamura |
| 2010/0246549 A1 | 9/2010 | Zhang |
| 2010/0250497 A1 | 9/2010 | Redlich |
| 2010/0250939 A1 | 9/2010 | Adams |
| 2010/0257149 A1 | 10/2010 | Cognigni |
| 2010/0268782 A1 | 10/2010 | Zombek |
| 2010/0272107 A1 | 10/2010 | Papp |
| 2010/0281263 A1 | 11/2010 | Ugawa |
| 2010/0284309 A1 | 11/2010 | Allan |
| 2010/0284404 A1 | 11/2010 | Gopinath |
| 2010/0293293 A1 | 11/2010 | Beser |
| 2010/0316052 A1 | 12/2010 | Petersen |
| 2010/0322249 A1 | 12/2010 | Thathapudi |
| 2010/0332595 A1 | 12/2010 | Fullagar |
| 2011/0013637 A1 | 1/2011 | Xue |
| 2011/0019674 A1 | 1/2011 | Iovanna |
| 2011/0022812 A1 | 1/2011 | vanderLinden |
| 2011/0029952 A1 | 2/2011 | Harrington |
| 2011/0055392 A1 | 3/2011 | Shen |
| 2011/0055921 A1 | 3/2011 | Narayanaswamy |
| 2011/0060716 A1 | 3/2011 | Forman |
| 2011/0060717 A1 | 3/2011 | Forman |
| 2011/0090908 A1 | 4/2011 | Jacobson |
| 2011/0106755 A1 | 5/2011 | Hao |
| 2011/0131308 A1 | 6/2011 | Eriksson |
| 2011/0137919 A1 | 6/2011 | Ryu |
| 2011/0145597 A1 | 6/2011 | Yamaguchi |
| 2011/0145858 A1 | 6/2011 | Philpott |
| 2011/0149858 A1 | 6/2011 | Hwang |
| 2011/0153840 A1 | 6/2011 | Narayana |
| 2011/0158122 A1 | 6/2011 | Murphy |
| 2011/0161408 A1 | 6/2011 | Kim |
| 2011/0202609 A1 | 8/2011 | Chaturvedi |
| 2011/0219093 A1 | 9/2011 | Ragunathan |
| 2011/0219427 A1 | 9/2011 | Hito |
| 2011/0219727 A1 | 9/2011 | May |
| 2011/0225293 A1 | 9/2011 | Rathod |
| 2011/0231578 A1 | 9/2011 | Nagappan |
| 2011/0239256 A1 | 9/2011 | Gholmieh |
| 2011/0258049 A1 | 10/2011 | Ramer |
| 2011/0264824 A1 | 10/2011 | Venkata Subramanian |
| 2011/0265159 A1 | 10/2011 | Ronda |
| 2011/0265174 A1 | 10/2011 | Thornton |
| 2011/0271007 A1 | 11/2011 | Wang |
| 2011/0280214 A1 | 11/2011 | Lee |
| 2011/0286457 A1 | 11/2011 | Ee |
| 2011/0286459 A1 | 11/2011 | Rembarz |
| 2011/0295783 A1 | 12/2011 | Zhao |
| 2011/0299454 A1 | 12/2011 | Krishnaswamy |
| 2012/0011170 A1 | 1/2012 | Elad |
| 2012/0011551 A1 | 1/2012 | Levy |
| 2012/0023113 A1 | 1/2012 | Ferren |
| 2012/0036180 A1 | 2/2012 | Thornton |
| 2012/0045064 A1 | 2/2012 | Rembarz |
| 2012/0047361 A1 | 2/2012 | Erdmann |
| 2012/0066727 A1 | 3/2012 | Nozoe |
| 2012/0079056 A1 | 3/2012 | TurÀjnyi |
| 2012/0102136 A1 | 4/2012 | Srebrny |
| 2012/0106339 A1 | 5/2012 | Mishra |
| 2012/0110159 A1 | 5/2012 | Richardson |
| 2012/0114313 A1 | 5/2012 | Phillips |
| 2012/0120803 A1 | 5/2012 | Farkas |
| 2012/0127994 A1 | 5/2012 | Ko |
| 2012/0136676 A1 | 5/2012 | Goodall |
| 2012/0136936 A1 | 5/2012 | Quintuna |
| 2012/0136945 A1 | 5/2012 | Lee |
| 2012/0137367 A1 | 5/2012 | Dupont |
| 2012/0141093 A1 | 6/2012 | Yamaguchi |
| 2012/0155464 A1 | 6/2012 | Kim |
| 2012/0158973 A1 | 6/2012 | Jacobson |
| 2012/0163373 A1 | 6/2012 | Lo |
| 2012/0166433 A1 | 6/2012 | Tseng |
| 2012/0170913 A1 | 7/2012 | Isozaki |
| 2012/0179653 A1 | 7/2012 | Araki |
| 2012/0197690 A1 | 8/2012 | Agulnek |
| 2012/0198048 A1 | 8/2012 | Ioffe |
| 2012/0221150 A1 | 8/2012 | Arensmeier |
| 2012/0224487 A1 | 9/2012 | Hui |

(56) References Cited

U.S. PATENT DOCUMENTS

| | | |
|---|---|---|
| 2012/0226902 A1 | 9/2012 | Kim |
| 2012/0233228 A1 | 9/2012 | Barton et al. |
| 2012/0257500 A1 | 10/2012 | Lynch |
| 2012/0284791 A1 | 11/2012 | Miller |
| 2012/0290669 A1 | 11/2012 | Parks |
| 2012/0290919 A1 | 11/2012 | Melnyk |
| 2012/0291102 A1 | 11/2012 | Cohen |
| 2012/0300669 A1 | 11/2012 | Zahavi |
| 2012/0307629 A1 | 12/2012 | Vasseur |
| 2012/0314580 A1 | 12/2012 | Hong |
| 2012/0317307 A1 | 12/2012 | Ravindran |
| 2012/0317655 A1 | 12/2012 | Zhang |
| 2012/0322422 A1 | 12/2012 | Frecks |
| 2012/0323933 A1 | 12/2012 | He |
| 2012/0331112 A1 | 12/2012 | Chatani |
| 2013/0024560 A1 | 1/2013 | Vasseur |
| 2013/0041982 A1 | 2/2013 | Shi |
| 2013/0051392 A1 | 2/2013 | Filsfils |
| 2013/0054971 A1 | 2/2013 | Yamaguchi |
| 2013/0060962 A1 | 3/2013 | Wang |
| 2013/0061084 A1 | 3/2013 | Barton |
| 2013/0066823 A1 | 3/2013 | Sweeney |
| 2013/0073552 A1 | 3/2013 | Rangwala |
| 2013/0073882 A1 | 3/2013 | Inbaraj |
| 2013/0074155 A1 | 3/2013 | Huh |
| 2013/0090942 A1 | 4/2013 | Robinson |
| 2013/0091237 A1 | 4/2013 | Ambalavanar |
| 2013/0091539 A1 | 4/2013 | Khurana |
| 2013/0110987 A1 | 5/2013 | Kim |
| 2013/0111063 A1 | 5/2013 | Lee |
| 2013/0128786 A1 | 5/2013 | Sultan |
| 2013/0132719 A1 | 5/2013 | Kobayashi |
| 2013/0139245 A1 | 5/2013 | Thomas |
| 2013/0151584 A1 | 6/2013 | Westphal |
| 2013/0151646 A1 | 6/2013 | Chidambaram |
| 2013/0152070 A1 | 6/2013 | Bhullar |
| 2013/0163426 A1 | 6/2013 | Beliveau |
| 2013/0166668 A1 | 6/2013 | Byun |
| 2013/0173822 A1 | 7/2013 | Hong |
| 2013/0182568 A1 | 7/2013 | Lee |
| 2013/0182931 A1 | 7/2013 | Fan |
| 2013/0185406 A1 | 7/2013 | Choi |
| 2013/0191412 A1 | 7/2013 | Kitamura |
| 2013/0197698 A1 | 8/2013 | Shah |
| 2013/0198119 A1 | 8/2013 | Eberhardt, III |
| 2013/0212185 A1 | 8/2013 | Pasquero |
| 2013/0219038 A1 | 8/2013 | Lee |
| 2013/0219081 A1 | 8/2013 | Qian |
| 2013/0219478 A1 | 8/2013 | Mahamuni |
| 2013/0223237 A1 | 8/2013 | Hui |
| 2013/0227048 A1 | 8/2013 | Xie |
| 2013/0227114 A1 | 8/2013 | Vasseur |
| 2013/0227166 A1 | 8/2013 | Ravindran |
| 2013/0242996 A1 | 9/2013 | Varvello |
| 2013/0250809 A1 | 9/2013 | Hui |
| 2013/0262365 A1 | 10/2013 | Dolbear |
| 2013/0262698 A1 | 10/2013 | Schwan |
| 2013/0275544 A1 | 10/2013 | Westphal |
| 2013/0282854 A1 | 10/2013 | Jang |
| 2013/0282860 A1 | 10/2013 | Zhang |
| 2013/0282920 A1 | 10/2013 | Zhang |
| 2013/0304758 A1 | 11/2013 | Gruber |
| 2013/0304937 A1 | 11/2013 | Lee |
| 2013/0325888 A1 | 12/2013 | Oneppo |
| 2013/0329696 A1 | 12/2013 | Xu |
| 2013/0332971 A1 | 12/2013 | Fisher |
| 2013/0336103 A1 | 12/2013 | Vasseur |
| 2013/0336323 A1 | 12/2013 | Srinivasan |
| 2013/0339481 A1 | 12/2013 | Hong |
| 2013/0343408 A1 | 12/2013 | Cook |
| 2014/0003232 A1 | 1/2014 | Guichard |
| 2014/0003424 A1 | 1/2014 | Matsuhira |
| 2014/0006354 A1 | 1/2014 | Parkison |
| 2014/0006565 A1 | 1/2014 | Muscariello |
| 2014/0029445 A1 | 1/2014 | Hui |
| 2014/0032714 A1 | 1/2014 | Liu |
| 2014/0033193 A1 | 1/2014 | Palaniappan |
| 2014/0040505 A1 | 2/2014 | Barton |
| 2014/0040628 A1 | 2/2014 | Fort |
| 2014/0043987 A1 | 2/2014 | Watve |
| 2014/0047513 A1 | 2/2014 | vantNoordende |
| 2014/0074730 A1 | 3/2014 | Arensmeier |
| 2014/0075567 A1 | 3/2014 | Raleigh |
| 2014/0082135 A1 | 3/2014 | Jung |
| 2014/0082661 A1 | 3/2014 | Krahnstoever |
| 2014/0089454 A1 | 3/2014 | Jeon |
| 2014/0096249 A1 | 4/2014 | Dupont |
| 2014/0098685 A1 | 4/2014 | Shattil |
| 2014/0108313 A1 | 4/2014 | Heidasch |
| 2014/0108474 A1 | 4/2014 | David |
| 2014/0115037 A1 | 4/2014 | Liu |
| 2014/0122587 A1 | 5/2014 | Petker et al. |
| 2014/0129736 A1 | 5/2014 | Yu |
| 2014/0136814 A1 | 5/2014 | Stark |
| 2014/0140348 A1 | 5/2014 | Perlman |
| 2014/0143370 A1 | 5/2014 | Vilenski |
| 2014/0146819 A1 | 5/2014 | Bae |
| 2014/0149733 A1 | 5/2014 | Kim |
| 2014/0156396 A1 | 6/2014 | deKozan |
| 2014/0165207 A1 | 6/2014 | Engel |
| 2014/0172783 A1 | 6/2014 | Suzuki |
| 2014/0172981 A1 | 6/2014 | Kim |
| 2014/0173034 A1 | 6/2014 | Liu |
| 2014/0173076 A1 | 6/2014 | Ravindran |
| 2014/0181140 A1 | 6/2014 | Kim |
| 2014/0192677 A1 | 7/2014 | Chew |
| 2014/0192717 A1 | 7/2014 | Liu |
| 2014/0195328 A1 | 7/2014 | Ferens |
| 2014/0195641 A1 | 7/2014 | Wang |
| 2014/0195666 A1 | 7/2014 | Dumitriu |
| 2014/0204945 A1 | 7/2014 | Byun |
| 2014/0214942 A1 | 7/2014 | Ozonat |
| 2014/0233575 A1 | 8/2014 | Xie |
| 2014/0237085 A1 | 8/2014 | Park |
| 2014/0237095 A1 | 8/2014 | Bevilacqua-Linn |
| 2014/0245359 A1 | 8/2014 | DeFoy |
| 2014/0254595 A1 | 9/2014 | Luo |
| 2014/0280823 A1 | 9/2014 | Varvello |
| 2014/0281489 A1 | 9/2014 | Peterka |
| 2014/0281505 A1 | 9/2014 | Zhang |
| 2014/0282816 A1 | 9/2014 | Xie |
| 2014/0289325 A1 | 9/2014 | Solis |
| 2014/0289790 A1 | 9/2014 | Wilson |
| 2014/0298248 A1 | 10/2014 | Kang |
| 2014/0314093 A1 | 10/2014 | You |
| 2014/0337276 A1 | 11/2014 | Iordanov |
| 2014/0365550 A1 | 12/2014 | Jang |
| 2015/0006896 A1 | 1/2015 | Franck |
| 2015/0018770 A1 | 1/2015 | Baran |
| 2015/0032892 A1 | 1/2015 | Narayanan |
| 2015/0033365 A1 | 1/2015 | Mellor |
| 2015/0039890 A1 | 2/2015 | Khosravi |
| 2015/0063802 A1 | 3/2015 | Bahadur |
| 2015/0089081 A1 | 3/2015 | Thubert |
| 2015/0095481 A1 | 4/2015 | Ohnishi |
| 2015/0095514 A1 | 4/2015 | Yu |
| 2015/0120663 A1 | 4/2015 | LeScouarnec |
| 2015/0169758 A1 | 6/2015 | Assom |
| 2015/0188770 A1 | 7/2015 | Naiksatam |
| 2015/0195149 A1 | 7/2015 | Vasseur |
| 2015/0207633 A1 | 7/2015 | Ravindran |
| 2015/0207864 A1 | 7/2015 | Wilson |
| 2015/0279348 A1 | 10/2015 | Cao |
| 2015/0288755 A1 | 10/2015 | Mosko |
| 2015/0312300 A1 | 10/2015 | Mosko |
| 2015/0349961 A1 | 12/2015 | Mosko |
| 2015/0372903 A1 | 12/2015 | Hui |
| 2015/0381546 A1 | 12/2015 | Mahadevan |
| 2016/0019275 A1 | 1/2016 | Mosko |
| 2016/0021172 A1 | 1/2016 | Mahadevan |
| 2016/0062840 A1 | 3/2016 | Scott |
| 2016/0110466 A1 | 4/2016 | Uzun |

(56) References Cited

U.S. PATENT DOCUMENTS

| | | | |
|---|---|---|---|
| 2016/0171184 A1 | 6/2016 | Solis | |
| 2016/0188591 A1* | 6/2016 | Bestler | G06F 3/067 707/744 |
| 2017/0048346 A1* | 2/2017 | Ravindran | H04L 67/2842 |

FOREIGN PATENT DOCUMENTS

| | | | |
|---|---|---|---|
| DE | 19620817 | A1 | 11/1997 |
| EP | 0295727 | A2 | 12/1988 |
| EP | 0757065 | A2 | 7/1996 |
| EP | 1077422 | A2 | 2/2001 |
| EP | 1383265 | A1 | 1/2004 |
| EP | 1384729 | A1 | 1/2004 |
| EP | 1473889 | A2 | 11/2004 |
| EP | 2120402 | | 11/2009 |
| EP | 2120419 | | 11/2009 |
| EP | 2120419 | A2 | 11/2009 |
| EP | 2124415 | A2 | 11/2009 |
| EP | 2214357 | A1 | 8/2010 |
| EP | 2299754 | A1 | 3/2011 |
| EP | 2323346 | | 5/2011 |
| EP | 2552083 | | 1/2013 |
| EP | 2214356 | | 5/2016 |
| WO | 03005288 | A2 | 1/2003 |
| WO | 03042254 | A1 | 5/2003 |
| WO | 03049369 | A2 | 6/2003 |
| WO | 03091297 | A1 | 11/2003 |
| WO | 2005041527 | | 5/2005 |
| WO | 2007113180 | A1 | 10/2007 |
| WO | 2007122620 | | 11/2007 |
| WO | 2007144388 | A1 | 12/2007 |
| WO | 2011049890 | A1 | 4/2011 |
| WO | 2012077073 | A1 | 6/2012 |
| WO | 2013123410 | | 8/2013 |
| WO | 2014023072 | | 2/2014 |
| WO | 2015084327 | | 6/2015 |

OTHER PUBLICATIONS

Akash Baid et al: "Comparing alternative approaches for networking of named objects in the future Internet", Computer Communications Workshops (Infocom Wkshps), 2012 IEEE Conference on, IEEE, Mar. 25, 2012, pp. 298-303, *Paragraph [002]* *figure 1*.
Priya Mahadevan: "CCNx 1.0 Tutorial", Mar. 16, 2014, pp. 1-11, Retrieved from the Internet: http://www.ccnx.org/pubs/hhg/1.2 %20CCNx%201.0%20Tutorial.pdf [retrieved on Jun. 8, 2016] *paragraphs [003] - [006], [0011], [0013]* *figures 1,2*.
Marc Mosko et al "All-In-One Streams for Content Centric Networks", May 24, 2015, retrieved from the Internet: http://www.ccnx.org/pubs/AllinOne.pdf [downloaded Jun. 9, 2016] *the whole document*.
Cesar Ghali et al. "Elements of Trust in Named-Data Networking", Feb. 13, 2014 Retrieved from the internet Jun. 17, 2016 http://arxiv.org/pdf/1402.3332v5.pdf *p. 5, col. 1* *p. 2, col. 1-2* * Section 4.1; p. 4, col. 2* *Section 4.2; p. 4, col. 2*.
Priya Mahadevan et al. "CCN-KRS", Proceedings of the 1st International Conference on Information-Centric Networking, Inc. '14, Sep. 24, 2014.
Flavin Roberto Santos Et al. "Funnel: Choking Polluters in BitTorrent File Sharing Communities", IEEE Transactions on Network and Service Management, IEEE vol. 8, No. 4, Dec. 1, 2011.
Liu Wai-Xi et al: "Multisource Dissemination in content-centric networking", 2013 Fourth International conference on the network of the future (NOF), IEEE, Oct. 23, 2013, pp. 1-5.
Marie-Jose Montpetit et al.: "Network coding meets information-centric networking", Proceedings of the 1st ACM workshop on emerging Name-Oriented mobile networking design, architecture, algorithms, and applications, NOM '12, Jun. 11, 2012, pp. 31-36.
Asokan et al.: "Server-Supported Signatures", Computer Security Esorics 96, Sep. 25, 1996, pp. 131-143, Section 3.

Mandl et al.: "A Fast FPGA Based Coprocessor Supporting Hard Real-Time Search", New Frontiers of Information Technology, Proceedings of the 23rd Euromicro Conference Budapest, Sep. 1, 1997, pp. 499-506 *The Whole Document*.
Sun et al.: "Content-Based Route Lookup Using CAMs", Global Communications Conference, IEEE, Dec. 3, 2012 *The Whole Document*.
Gelenbe et al.: "Networks With Cognitive Packets", Modeling, Analysis and Simulation of Computer and Telecommunication Systems, 2000. IEEE, Aug. 29, 2000, pp. 3-10.
Vangelis et al.: "On the Role of Semantic Descriptions for Adaptable Protocol Stacks in the Internet of Things", 2014 28th International Conference on Advanced Information Networking and Applications Workshops, IEEE, May 13, 2014, pp. 437-443, *last paragraph of section II.B*.
Smetters et al. "Securing Network Content" Technical Report, PARC TR-2009-1, Oct. 1, 2009, Retrieved from the internet URL:http//www.parc.com/content/attachments/TR-2009-01.pdf [retrieved Nov. 1, 2016].
Marc Mosko "CCNx Label Forwarding (CCNLF)" Jul. 21, 2014.
Gallo Alcatel-Lucent Bell Labs "Content-Centric Networking Packet Header Format" Jan. 26, 2015.
Huard J-F et al. "A Programmable Transport Architecture with QOS Guarantees" IEEE Communications Magazine, vol. 36, No. 10, Oct. 1, 1998.
Microsoft Computer Dictionary, Fifth Edition, 2002, Microsoft Press, p. 23.
Mind—A Brief Introduction, John R. Searle, 2004, Oxford University Press, pp. 62-67.
Jacobson, Van et al., "Content-Centric Networking, Whitepaper Describing Future Assurable Global Networks", Palo Alto Research Center, Inc., Jan. 30, 2007, pp. 1-9.
Koponen, Teemu et al., "A Data-Oriented (and Beyond) Network Architecture", SIGCOMM '07, Aug. 27-31, 2007, Kyoto, Japan, XP-002579021, p. 181-192.
Baugher, Mark et al., "Self-Verifying Names for Read-Only Named Data", 2012 IEEE Conference on Computer Communications Workshops (INFOCOM WKSHPS), Mar. 2012, pp. 274-279.
Gasti, Paolo et al., 'DoS & DDoS in Named Data Networking', 2013 22nd International Conference on Computer Communications and Networks (ICCCN), Aug. 2013, pp. 1-7.
Zhang, et al., "Named Data Networking (NDN) Project", http://www.parc.com/publication/2709/named-data-networking-ndn-project.html, Oct. 2010, NDN-0001, PARC Tech Report.
Ao-Jan Su, David R. Choffnes, Aleksandar Kuzmanovic, and Fabian E. Bustamante. Drafting Behind Akamai: Inferring Network Conditions Based on CDN Redirections. IEEE/ACM Transactions on Networking {Feb. 2009).
"PBC Library-Pairing-Based Cryptography-About," http://crypto.stanford.edu/pbc. downloaded Apr. 27, 2015.
C. Gentry and A. Silverberg. Hierarchical ID-Based Cryptography. Advances in Cryptology—ASIACRYPT 2002. Springer Berlin Heidelberg (2002).
Boneh et al., "Collusion Resistant Broadcast Encryption With Short Ciphertexts and Private Keys", 2005.
D. Boneh and M. Franklin. Identity-Based Encryption from the Weil Pairing. Advances in Cryptology—CRYPTO 2001, vol. 2139, Springer Berlin Heidelberg (2001).
Anteniese et al., "Improved Proxy Re-Encryption Schemes with Applications to Secure Distributed Storage", 2006.
Xiong et al., "CloudSeal: End-to-End Content Protection in Cloud-based Storage and Delivery Services", 2012.
J. Bethencourt, A, Sahai , and B. Waters, 'Ciphertext-policy attribute-based encryption,' in Proc. IEEE Security & Privacy 2007, Berkeley, CA, USA, May 2007, pp. 321-334.
J. Lotspiech, S. Nusser, and F. Pestoni. Anonymous Trust: Digit.
J. Shao and Z. Cao. CCA-Secure Proxy Re-Encryption without Pairings. Public Key Cryptography. Springer Lecture Notes in Computer Sciencevol. 5443 (2009).
Gopal et al. "Integrating content-based Mechanisms with hierarchical File systems", Feb. 1999, University of Arizona, 15 pages.

(56) References Cited

OTHER PUBLICATIONS

R. H. Deng, J. Weng, S. Liu, and K. Chen. Chosen-Ciphertext Secure Proxy Re-Encryption without Pairings. CANS. Spring Lecture Notes in Computer Science vol. 5339 (2008).
RTMP (2009). Available online at http://wwwimages.adobe.com/ www.adobe.com/content/dam/Adobe/en/devnet/rtmp/ pdf/rtmp specification 1.0.pdf.
S. Chow, J. Weng, Y. Yang, and R. Deng. Efficient Unidirectional Proxy Re-Encryption. Progress in Cryptology—AFRICACRYPT 2010. Springer Berlin Heidelberg (2010).
S. Kamara and K. Lauter. Cryptographic Cloud Storage. Financial Cryptography and Data Security. Springer Berlin Heidelberg (2010).
Sandvine, Global Internet Phenomena Report—Spring 2012. Located online at http://www.sandvine.com/downloads/ documents/Phenomenal H 2012/Sandvine Global Internet Phenomena Report 1H 2012.pdf.
The Despotify Project (2012). Available online at http://despotify.sourceforge.net/.
V. K. Adhikari, S. Jain, Y. Chen, and Z.-L. Zhang. Vivisecting Youtube:An Active Measurement Study. In INFOCOM12 Mini-conference (2012).
Vijay Kumar Adhikari, Yang Guo, Fang Hao, Matteo Varvello, Volker Hilt, Moritz Steiner, and Zhi-Li Zhang. Unreeling Netflix: Understanding and Improving Multi-CDN Movie Delivery. In the Proceedings of IEEE INFOCOM 2012 (2012).
Jacobson, Van et al. 'VoCCN: Voice Over Content-Centric Networks.' Dec. 1, 2009. ACM ReArch'09.
Rosenberg, J. "Interactive Connectivity Establishment (ICE): A Protocol for Network Address Translator (NAT) Traversal for Offer/Answer Protocols", Apr. 2010, pp. 1-117.
Shih, Eugene et al., 'Wake on Wireless: An Event Driven Energy Saving Strategy for Battery Operated Devices', Sep. 23, 2002, pp. 160-171.
Fall, K. et al., "DTN: an architectural retrospective", Selected areas in communications, IEEE Journal on, vol. 28, No. 5, Jun. 1, 2008, pp. 828-835.
Gritter, M. et al., 'An Architecture for content routing support in the Internet', Proceedings of 3rd Usenix Symposium on Internet Technologies and Systems, 2001, pp. 37-48.
"CCNx," http://ccnx.org/. downloaded Mar. 11, 2015.
"Content Delivery Network", Wikipedia, Dec. 10, 2011, http://en.wikipedia.org/w/index.php?title=Content_delivery_network &oldid=465077460.
"Digital Signature" archived on Aug. 31, 2009 at http://web.archive.org/web/20090831170721/http://en.wikipedia.org/wiki/ Digital_signature.
"Introducing JSON," http://www.json.org/. downloaded Mar. 11, 2015.
"Microsoft PlayReady," http://www.microsoft.com/playready/. downloaded Mar. 11, 2015.
"Pursuing a pub/sub Internet (PURSUIT)," http://www.fp7-pursuit.ew/PursuitWeb/. downloaded Mar. 11, 2015.
"The FP7 4WARD project," http://www.4ward-project.eu/. downloaded Mar. 11, 2015.
A. Broder and A. Karlin, "Multilevel Adaptive Hashing", Jan. 1990, pp. 43-53.
Detti, Andrea, et al. "CONET: a content centric inter-networking architecture." Proceedings of the ACM SIGCOMM workshop on Information-centric networking. ACM, 2011.
A. Wolman, M. Voelker, N. Sharma N. Cardwell, A. Karlin, and H.M. Levy, "On the scale and performance of cooperative web proxy caching," ACM SIGHOPS Operating Systems Review, vol. 33, No. 5, pp. 16-31, Dec. 1999.
Afanasyev, Alexander, et al. "Interest flooding attack and countermeasures in Named Data Networking." IFIP Networking Conference, 2013. IEEE, 2013.
B. Ahlgren et al., 'A Survey of Information-centric Networking' IEEE Commun. Magazine, Jul. 2012, pp. 26-36.
Bari, MdFaizul, et al. 'A survey of naming and routing in information-centric networks.' Communications Magazine, IEEE 50.12 (2012): 44-53.
Brambley, Michael, A novel, low-cost, reduced-sensor approach for providing smart remote monitoring and diagnostics for packaged air conditioners and heat pumps. Pacific Northwest National Laboratory, 2009.
C.A. Wood and E. Uzun, "Flexible end-to-end content security in CCN," in Proc. IEEE CCNC 2014, Las Vegas, CA, USA, Jan. 2014.
Carzaniga, Antonio, Matthew J. Rutherford, and Alexander L. Wolf. 'A routing scheme for content-based networking.' INFOCOM 2004. Twenty-third Annual Joint Conference of the IEEE Computer and Communications Societies. vol. 2. IEEE, 2004.
Cho, Jin-Hee, Ananthram Swami, and Ray Chen. "A survey on trust management for mobile ad hoc networks." Communications Surveys & Tutorials, IEEE 13.4 (2011): 562-583.
Compagno, Alberto, et al. "Poseidon: Mitigating interest flooding DDoS attacks in named data networking." Local Computer Networks (LCN), 2013 IEEE 38th Conference on. IEEE, 2013.
Conner, William, et al. "A trust management framework for service-oriented environments." Proceedings of the 18th international conference on World wide web. ACM, 2009.
Content Centric Networking Project (CCN) [online], http://ccnx.org/releases/latest/doc/technical/, Downloaded Mar. 9, 2015.
Content Mediator Architecture for Content-aware Networks (COMET) Project [online], http://www.comet-project.org/, Downloaded Mar. 9, 2015.
D.K. Smetters, P. Golle, and J.D. Thornton, "CCNx access control specifications," PARC, Tech. Rep., Jul. 2010.
Dabirmoghaddam, Ali, Maziar Mirzazad Barijough, and J. J. Garcia-Luna-Aceves. 'Understanding optimal caching and opportunistic caching at the edge of information-centric networks.' Proceedings of the 1st international conference on Information-centric networking. ACM, 2014.
Detti et al., "Supporting the Web with an information centric network that routes by name", Aug. 2012, Computer Networks 56, pp. 3705-3702.
Dijkstra, Edsger W., and Carel S. Scholten. 'Termination detection for diffusing computations.' Information Processing Letters 11.1 (1980): 1-4.
Dijkstra, Edsger W., Wim Hj Feijen, and A_J M. Van Gasteren. "Derivation of a termination detection algorithm for distributed computations." Control Flow and Data Flow: concepts of distributed programming. Springer Berlin Heidelberg, 1986. 507-512.
E. Rescorla and N. Modadugu, "Datagram transport layer security," IETF RFC 4347, Apr. 2006.
E.W. Dijkstra, W. Feijen, and A.J.M. Van Gasteren, "Derivation of a Termination Detection Algorithm for Distributed Computations," Information Processing Letter, vol. 16, No. 5, 1983.
Fayazbakhsh, S. K., Lin, Y., Tootoonchian, A., Ghodsi, A., Koponen, T., Maggs, B., & Shenker, S. {Aug. 2013). Less pain, most of the gain: Incrementally deployable ICN. In ACM SIGCOMM Computer Communication Review (vol. 43, No. 4, pp. 147-158). ACM.
G. Tyson, S. Kaune, S. Miles, Y. El-Khatib, A. Mauthe, and A. Taweel, "A trace-driven analysis of caching in content-centric networks," in Proc. IEEE ICCCN 2012, Munich, Germany, Jul.-Aug. 2012, pp. 1-7.
G. Wang, Q. Liu, and J. Wu, "Hierarchical attribute-based encryption for fine-grained access control in cloud storage services," in Proc. ACM CCS 2010, Chicago, IL, USA, Oct. 2010, pp. 735-737.
G. Xylomenos et al., "A Survey of Information-centric Networking Research," IEEE Communication Surveys and Tutorials, Jul. 2013.
Garcia, Humberto E., Wen-Chiao Lin, and Semyon M. Meerkov. "A resilient condition assessment monitoring system." Resilient Control Systems (ISRCS), 2012 5th International Symposium on. IEEE, 2012.
Garcia-Luna-Aceves, Jose J. 'A unified approach to loop-free routing using distance vectors or link states.' ACM SIGCOMM Computer Communication Review. vol. 19. No. 4. ACM, 1989.
Garcia-Luna-Aceves, Jose J. 'Name-Based Content Routing in Information Centric Networks Using Distance Information' Proc ACM ICN 2014, Sep. 2014.

(56) References Cited

OTHER PUBLICATIONS

Ghali, Cesar, GeneTsudik, and Ersin Uzun. "Needle in a Haystack: Mitigating Content Poisoning in Named-Data Networking." Proceedings of NDSS Workshop on Security of Emerging Networking Technologies (SENT). 2014.
Ghodsi, Ali, et al. "Information-centric networking: seeing the forest for the trees." Proceedings of the 10th ACM Workshop on Hot Topics in Networks. ACM, 2011.
Ghodsi, Ali, et al. "Naming in content-oriented architectures." Proceedings of the ACM SIGCOMM workshop on Information-centric networking. ACM, 2011.
Gupta, Anjali, Barbara Liskov, and Rodrigo Rodrigues. "Efficient Routing for Peer-to-Peer Overlays." NSDI. vol. 4. 2004.
Heckerman, David, John S. Breese, and Koos Rommelse. "Decision-Theoretic Troubleshooting." Communications of the ACM. 1995.
Heinemeier, Kristin, et al. "Uncertainties in Achieving Energy Savings from HVAC Maintenance Measures in the Field." ASHRAE Transactions 118.Part 2 {2012}.
Herlich, Matthias et al., "Optimizing Energy Efficiency for Bulk Transfer Networks", Apr. 13, 2010, pp. 1-3, retrieved for the Internet: URL:http://www.cs.uni-paderborn.de/fileadmin/informationik/ag-karl/publications/miscellaneous/optimizing.pdf (retrieved on Mar. 9, 2012).
Hoque et al., 'NLSR: Named-data Link State Routing Protocol', Aug. 12, 2013, ICN 2013, pp. 15-20.
https://code.google.com/p/ccnx-trace/.
I. Psaras, R.G. Clegg, R. Landa, W.K. Chai, and G. Pavlou, "Modelling and evaluation of CCN-caching trees," in Proc. IFIP Networking 2011, Valencia, Spain, May 2011, pp. 78-91.
Intanagonwiwat, Chalermek, Ramesh Govindan, and Deborah Estrin. 'Directed diffusion: a scalable and robust communication paradigm for sensor networks.' Proceedings of the 6th annual international conference on Mobile computing and networking. ACM, 2000.
J. Aumasson and D. Bernstein, "SipHash: a fast short-input PRF", Sep. 18, 2012.
J. Hur, "Improving security and efficiency in attribute-based data sharing," IEEE Trans. Knowledge Data Eng., vol. 25, No. 10, pp. 2271-2282, Oct. 2013.
V. Jacobson et al., 'Networking Named Content,' Proc. IEEE CoNEXT '09, Dec. 2009.
Jacobson et al., "Custodian-Based Information Sharing," Jul. 2012, IEEE Communications Magazine: vol. 50 Issue 7 (p. 3843).
Ji, Kun, et al. "Prognostics enabled resilient control for model-based building automation systems." Proceedings of the 12th Conference of International Building Performance Simulation Association. 2011.
K. Liang, L. Fang, W. Susilo, and D.S. Wong, "A Ciphertext-policy attribute-based proxy re-encryption with chosen-ciphertext security," in Proc. INCoS 2013, Xian, China, Sep. 2013, pp. 552-559.
Katipamula, Srinivas, and Michael R. Brambley. "Review article: methods for fault detection, diagnostics, and prognostics for building systemsa review, Part I." HVAC&R Research 11.1 (2005): 3-25.
Katipamula, Srinivas, and Michael R. Brambley. "Review article: methods for fault detection, diagnostics, and prognostics for building systemsa review, Part II." HVAC&R Research 11.2 (2005): 169-187.
L. Wang et al., 'OSPFN: An OSPF Based Routing Protocol for Named Data Networking,' Technical Report NDN-0003, 2012.
L. Zhou, V. Varadharajan, and M. Hitchens, "Achieving secure role-based access control on encrypted data in cloud storage," IEEE Trans. Inf. Forensics Security, vol. 8, No. 12, pp. 1947-1960, Dec. 2013.
Li, Wenjia, Anupam Joshi, and Tim Finin. "Coping with node misbehaviors in ad hoc networks: A multi-dimensional trust management approach." Mobile Data Management (MDM), 2010 Eleventh International Conference on. IEEE, 2010.
Lopez, Javier, et al. "Trust management systems for wireless sensor networks: Best practices." Computer Communications 33.9 (2010): 1086-1093.
M. Green and G. Ateniese, "Identity-based proxy re-encryption," in Proc. ACNS 2007, Zhuhai, China, Jun. 2007, pp. 288-306.
M. Ion, J. Zhang, and E.M. Schooler, "Toward content-centric privacy in ICN: Attribute-based encryption and routing," in Proc. ACM SIGCOMM ICN 2013, Hong Kong, China, Aug. 2013, pp. 39-40.
M. Naor and B. Pinkas "Efficient trace and revoke schemes," in Proc. FC 2000, Anguilla, British West Indies, Feb. 2000, pp. 1-20.
M. Nystrom, S. Parkinson, A. Rusch, and M. Scott, "PKCS#12: Personal information exchange syntax v. 1.1," IETF RFC 7292, K. Moriarty, Ed., Jul. 2014.
M. Parsa and J.J. Garcia-Luna-Aceves, "A Protocol for Scalable Loop-free Multicast Routing." IEEE JSAC, Apr. 1997.
M. Walfish, H. Balakrishnan, and S. Shenker, "Untangling the web from DNS," in Proc. USENIX NSDI 2004, Oct. 2010, pp. 735-737.
Mahadevan, Priya, et al. "Orbis: rescaling degree correlations to generate annotated internet topologies." ACM SIGCOMM Computer Communication Review. vol. 37. No. 4. ACM, 2007.
Mahadevan, Priya, et al. "Systematic topology analysis and generation using degree correlations." ACM SIGCOMM Computer Communication Review. vol. 36. No. 4. ACM, 2006.
Matocha, Jeff, and Tracy Camp. 'A taxonomy of distributed termination detection algorithms.' Journal of Systems and Software 43.3 (1998): 207-221.
Matteo Varvello et al., "Caesar: A Content Router for High Speed Forwarding", ICN 2012, Second Edition on Information-Centric Networking, New York, Aug. 2012.
McWilliams, Jennifer A., and Iain S. Walker. "Home Energy Article: A Systems Approach to Retrofitting Residential HVAC Systems." Lawrence Berkeley National Laboratory (2005).
Merindol et al., "An efficient algorithm to enable path diversity in link state routing networks", Jan. 10, Computer Networks 55 (2011), pp. 1132-1140.
Mobility First Project [online], http://mobilityfirst.winlab.rutgers.edu/, Downloaded Mar. 9, 2015.
Narasimhan, Sriram, and Lee Brownston. "HyDE—A General Framework for Stochastic and Hybrid Modelbased Diagnosis." Proc. DX 7 (2007): 162-169.
NDN Project [online], http://www.named-data.net/, Downloaded Mar. 9, 2015.
Omar, Mawloud, Yacine Challal, and Abdelmadjid Bouabdallah. "Certification-based trust models in mobile ad hoc networks: A survey and taxonomy." Journal of Network and Computer Applications 35.1 (2012): 268-286.
P. Mahadevan, E.Uzun, S. Sevilla, and J. Garcia-Luna-Aceves, "CCN-krs: A key resolution service for ccn," in Proceedings of the 1st International Conference on Information-centric Networking, Ser. INC 14 New York, NY, USA: ACM, 2014, pp. 97-106. [Online]. Available: http://doi.acm.org/10.1145/2660129.2660154.
S. Deering, "Multicast Routing in Internetworks and Extended LANs," Proc. ACM SIGCOMM '88, Aug. 1988.
S. Deering et al., "The PIM architecture for wide-area multicast routing," IEEE/ACM Trans, on Networking, vol. 4, No. 2, Apr. 1996.
S. Jahid, P. Mittal, and N. Borisov, "EASiER: Encryption-based access control in social network with efficient revocation," in Proc. ACM ASIACCS 2011, Hong Kong, China, Mar. 2011, pp. 411-415.
S. Kamara and K. Lauter, "Cryptographic cloud storage," in Proc. FC 2010, Tenerife, Canary Islands, Spain, Jan. 2010, pp. 136-149.
S. Kumar et al. "Peacock Hashing: Deterministic and Updatable Hashing for High Performance Networking," 2008, pp. 556-564.
S. Misra, R. Tourani, and N.E. Majd, "Secure content delivery in information-centric networks: Design, implementation, and analyses," in Proc. ACM SIGCOMM ICN 2013, Hong Kong, China, Aug. 2013, pp. 73-78.
S. Yu, C. Wang, K. Ren, and W. Lou, "Achieving secure, scalable, and fine-grained data access control in cloud computing," in Proc. IEEE INFOCOMM 2010, San Diego, CA, USA, Mar. 2010, pp. 1-9.

(56) References Cited

OTHER PUBLICATIONS

S.J. Lee, M. Gerla, and C. Chiang, "On-demand Multicast Routing Protocol in Multihop Wireless Mobile Networks," Mobile Networks and Applications, vol. 7, No. 6, 2002.
Scalable and Adaptive Internet Solutions (SAIL) Project [online], http://sail-project.eu/ Downloaded Mar. 9, 2015.
Schein, Jeffrey, and Steven T. Bushby. A Simulation Study of a Hierarchical, Rule-Based Method for System-Level Fault Detection and Diagnostics in HVAC Systems. US Department of Commerce,[Technology Administration], National Institute of Standards and Technology, 2005.
Shani, Guy, Joelle Pineau, and Robert Kaplow. "A survey of point-based POMDP solvers." Autonomous Agents and Multi-Agent Systems 27.1 (2013): 1-51.
Sheppard, John W., and Stephyn GW Butcher. "A formal analysis of fault diagnosis with d-matrices." Journal of Electronic Testing 23.4 (2007): 309-322.
Shneyderman, Alex et al., 'Mobile VPN: Delivering Advanced Services in Next Generation Wireless Systems', Jan. 1, 2003, pp. 3-29.
Solis, Ignacio, and J. J. Garcia-Luna-Aceves. 'Robust content dissemination in disrupted environments.' proceedings of the third ACM workshop on Challenged networks. ACM, 2008.
Sun, Ying, and Daniel S. Weld. "A framework for model-based repair." AAAI. 1993.
T. Ballardie, P. Francis, and J. Crowcroft, "Core Based Trees (CBT)," Proc. ACM SIGCOMM '88, Aug. 1988.
T. Dierts, "The transport layer security (TLS) protocol version 1.2," IETF RFC 5246, 2008.
T. Koponen, M. Chawla, B.-G. Chun, A. Ermolinskiy, K.H. Kim, S. Shenker, and I. Stoica, 'A data-oriented (and beyond) network architecture,' ACM SIGCOMM Computer Communication Review, vol. 37, No. 4, pp. 181-192, Oct. 2007.
V. Goyal, 0. Pandey, A. Sahai, and B. Waters, "Attribute-based encryption for fine-grained access control of encrypted data," in Proc. ACM CCS 2006, Alexandria, VA, USA, Oct.-Nov. 2006, pp. 89-98.
V. Jacobson, D.K. Smetters, J.D. Thornton, M.F. Plass, N.H. Briggs, and R.L. Braynard, 'Networking named content,' in Proc. ACM CoNEXT 2009, Rome, Italy, Dec. 2009, pp. 1-12.
Verma, Vandi, Joquin Fernandez, and Reid Simmons. "Probabilistic models for monitoring and fault diagnosis." The Second IARP and IEEE/RAS Joint Workshop on Technical Challenges for Dependable Robots in Human Environments. Ed. Raja Chatila. Oct. 2002.
Vutukury, Srinivas, and J. J. Garcia-Luna-Aceves. A simple approximation to minimum-delay routing. vol. 29. No. 4. ACM, 1999.
W.-G. Tzeng and Z.-J. Tzeng, "A public-key traitor tracing scheme with revocation using dynamic shares," in Proc. PKC 2001, Cheju Island, Korea, Feb. 2001, pp. 207-224.
Waldvogel, Marcel "Fast Longest Prefix Matching: Algorithms, Analysis, and Applications", A dissertation submitted to the Swiss Federal Institute of Technology Zurich, 2002.
Walker, Iain S. Best practices guide for residential HVAC Retrofits. No. LBNL-53592. Ernest Orlando Lawrence Berkeley National Laboratory, Berkeley, CA (US), 2003.
Wang, Jiangzhe et al.,"DMND: Collecting Data from Mobiles Using Named Data", Vehicular Networking Conference, 2010 IEEE, pp. 49-56.
Xylomenos, George, et al. "A survey of information-centric networking research." Communications Surveys & Tutorials, IEEE 16.2 (2014): 1024-1049.
Yi, Cheng, et al. 'A case for stateful forwarding plane.' Computer Communications 36.7 (2013): 779-791.
Yi, Cheng, et al. 'Adaptive forwarding in named data networking.' ACM SIGCOMM computer communication review 42.3 (2012): 62-67.
Zahariadis, Theodore, et al. "Trust management in wireless sensor networks." European Transactions on Telecommunications 21.4 (2010): 386-395.
Zhang, Lixia, et al. 'Named data networking.' ACM SIGCOMM Computer Communication Review 44.3 {2014): 66-73.
Soh et al., "Efficient Prefix Updates for IP Router Using Lexicographic Ordering and Updateable Address Set", Jan. 2008, IEEE Transactions on Computers, vol. 57, No. 1.
Beben et al., "Content Aware Network based on Virtual Infrastructure", 2012 13th ACIS International Conference on Software Engineering.
Biradar et al., "Review of multicast routing mechanisms in mobile ad hoc networks", Aug. 16, Journal of Network and Computer Applications 35 (2012) 221-229.
D. Trossen and G. Parisis, "Designing and realizing and information-centric internet," IEEE Communications Magazing, vol. 50, No. 7, pp. 60-67, Jul. 2012.
Garcia-Luna-Aceves et al., "Automatic Routing Using Multiple Prefix Labels", 2012, IEEE, Ad Hoc and Sensor Networking Symposium.
Ishiyama, "On the Effectiveness of Diffusive Content Caching in Content-Centric Networking", Nov. 5, 2012, IEEE, Information and Telecommunication Technologies (APSITT), 2012 9th Asia-Pacific Symposium.
J. Hur and D.K. Noh, "Attribute-based access control with efficient revocation in data outsourcing systers," IEEE Trans. Parallel Distrib. Syst, vol. 22, No. 7, pp. 1214-1221, Jul. 2011.
Kaya et al., "A Low Power Lookup Technique for Multi-Hashing Network Applications", 2006 IEEE Computer Society Annual Symposium on Emerging VLSI Technologies and Architectures, Mar. 2006.
Hoque et al., "NLSR: Named-data Link State Routing Protocol", Aug. 12, 2013, ICN'13.
Nadeem Javaid, "Analysis and design of quality link metrics for routing protocols in Wireless Networks", PhD Thesis Defense, Dec. 15, 2010, Universete Paris-Est.
Wetherall, David, "Active Network vision and reality: Lessons form a capsule-based system", ACM Symposium on Operating Systems Principles, Dec. 1, 1999. pp. 64-79.
Kulkarni A.B. et al., "Implementation of a prototype active network", IEEE, Open Architectures and Network Programming, Apr. 3, 1998, pp. 130-142.
Xie et al. "Collaborative Forwarding and Caching in Content Centric Networks", Networking 2012.
Amadeo et al. "Design and Analysis of a Transport-Level Solution for Content-Centric VANETs", University "Mediterranea" of Reggio Calabria, Jun. 15, 2013.
Lui et al. (A TLV-Structured Data Naming Scheme for Content-Oriented Networking, pp. 5822-5827, International Workshop on the Network of the Future, Communications (ICC), 2012 IEEE International Conference on Jun. 10-15, 2012).
Peter Dely et al. "OpenFlow for Wireless Mesh Networks" Computer Communications and Networks, 2011 Proceedings of 20th International Conference on, IEEE, Jul. 31, 2011 (Jul. 31, 2011), pp. 1-6.
Garnepudi Parimala et al "Proactive, reactive and hybrid multicast routing protocols for Wireless Mesh Networks", 2013 IEEE International Conference on Computational Intelligence and Computing Research, IEEE, Dec. 26, 2013, pp. 1-7.
Tiancheng Zhuang et al. "Managing Ad Hoc Networks of Smartphones", International Journal of Information and Education Technology, Oct. 1, 2013.
Van Kesteren (editor), "Cross-Origin Resource Sharing", http://web.archive.org/web/2015030803226/http://www.w3.org/TR/cors, W3C, Jan. 16, 2014, 23 pgs.
Mosko, et al., "CCNx 1.0 Protocol Architecture", http://www.ccnx.org/pubs/CCNxProtocolArchitecture.pdf, Sep. 24, 2014, 10 pgs.
Extended European Search Report issued in counterpart European Application No. 16187938.2-1853, dated Jan. 17, 2017, 11 pgs.

* cited by examiner

TABLE 300

| CRUD Command 302 | Function Signature 304 | Description 306 |
| --- | --- | --- |
| Create 312 | (success, manifest) = IDFCreate(lciName, ACS) | Make a file available with the given LCI encoded name and access information encoded in a CCN AccessControlSpecification object |
| Read 314 | buffer = IDFRead(lciName, numbytes=0, offset=0) | Read data of numbytes size from the specified LCI encoded name starting at the given offset |
| Update 316 | count = IDFUpdate(lciName, buffer, count, offset=0) | Update the file with the given LCI encoded name with the specified data in buffer starting at the given offset (default is 0) |
| Delete 318 | success = IDFDelete(lciName) | Make a file that was previously available, unavailable. |

FIG. 3

COMMUNICATION 460

INFORMATION AND DATA FRAMEWORK IN A CONTENT CENTRIC NETWORK

RELATED APPLICATIONS

This application claims the benefit of:

U.S. Provisional Application No. 62/232,240, titled "NETWORK-AGNOSTIC SYSTEMS IN A NETWORKED WORLD," by inventors Glenn C. Scott and Christopher A. Wood, filed 24 Sep. 2015, the disclosure of which is incorporated by reference.

The subject matter of this application is related to the subject matter in the following applications:

U.S. patent application Ser. No. 13/847,814 entitled "ORDERED-ELEMENT NAMING FOR NAME-BASED PACKET FORWARDING," by inventor Ignacio Solis, filed 20 Mar. 2013 (hereinafter "U.S. patent application Ser. No. 13/847,814");

U.S. patent application Ser. No. 12/338,175 entitled "CONTROLLING THE SPREAD OF INTERESTS AND CONTENT IN A CONTENT CENTRIC NETWORK," by inventors Van L. Jacobson and Diana K. Smetters, filed 18 Dec. 2008 (hereinafter "U.S. patent application Ser. No. 12/338,175"); and U.S. patent application Ser. No. 14/231,515 entitled "AGGREGATE SIGNING OF DATA IN CONTENT CENTRIC NETWORKING," by inventors Ersin Uzun, Marc E. Mosko, Michael F. Plass, and Glenn C. Scott, filed 31 Mar. 2014(hereinafter "U.S. patent. application. Ser. No. 14/231,515");

the disclosures of which are herein incorporated by reference in their entirety.

BACKGROUND

Field

This disclosure is generally related to distribution of digital content. More specifically, this disclosure is related to a system which facilitates a single, standard interface for file input/output and network communication based on an information and data framework in a content centric network.

Related Art

The proliferation of the Internet and e-commerce continues to create a vast amount of digital content. Content centric network (CCN) architectures have been designed to facilitate accessing and processing such digital content. A CCN includes entities, or nodes, such as network clients, forwarders (e.g., routers), and content producers, which communicate with each other by sending interest packets for various content items and receiving content object packets in return. CCN interests and content objects are identified by their unique names, which are typically hierarchically structured variable length identifiers (HSVLI). An HSVLI can include contiguous name components ordered from a most general level to a most specific level. A CCN name prefix, or namespace, may include one or more contiguous name components beginning from the most general level.

CCN relies on an abstraction layer in the form of requests and content responses between applications and the location where content is stored. This abstraction layer is implemented based on a CCN Portal. The CCN Portal API enables messages to be constructed in a location-agnostic manner based on discrete interests and content objects. At the same time, many modern systems and applications rely on a file as a high-level abstraction upon which other data access mechanisms are implemented (e.g., video streams, databases, messages, and key-values stores). While CCN interests and content objects may serve as a vehicle for transferring raw data, some issues remain unsolved with using CCN interests and content objects as the aforementioned abstractions without another layer of indirection.

SUMMARY

One embodiment provides a system that facilitates a single interface for file I/O and network communication. During operation, the system receives from a local application a first command to create content, wherein the first command includes a name for the content and access control information that indicates how the content may be accessed, wherein the content name is a hierarchically structured variable length identifier that includes contiguous name components ordered from a most general level to a most specific level. The system creates a first manifest which is a content object that indicates a set of member content objects by a name and a digest, wherein a name for the first manifest is the content name corresponding to the first command, wherein access to the manifest is based on the access control information included in the first command. The system transmits to the local application the first manifest and an indicator of success for creating the first manifest, thereby facilitating an interface for the local application to process network data in a content centric network In some embodiments, the system receives from the local application a second command to update the content with new data, wherein the second command includes the first manifest name or a name of a member content object as indicated in the first manifest, a buffer which contains the new data for the update, a count for subsequent use in indicating a successful update, and an offset within the first manifest or within the member content object from which the new data is to be written. The system updates the first manifest or the member content object by writing the new data in the buffer to the first manifest or the member content object starting from the offset. The system returns the count to the local application.

In some embodiments, the system stores the first manifest and the member content objects in a local cache or a storage device accessible to the computer system.

In some embodiments, the system receives from the local application a third command to delete the content, wherein the third command includes the first manifest name or the name of the member content object to be deleted. The system deletes the first manifest or the member content object from a local cache or a storage device accessible by the computer system. The system transmits to the local application an indicator of success for deleting the content.

In some embodiments, the system receives a fourth command to read content, wherein the fourth command includes a second content name that is a hierarchically structured variable length identifier that includes contiguous name components ordered from a most general level to a most specific level, a number of bytes of data to read, and an offset from which the data is to be read. In response to determining that the content is available in a local cache or a storage device accessible to the computer system, the system transmits the content to the local application. In response to determining that the content is not available in the local cache or the storage device accessible to the computer system, the system performs the following operations: generates an interest with a name that is the second content name, wherein the interest is transmitted to a remote device; receives a second manifest which is a content object that indicates a set of member content objects by a name and a digest, wherein a name for the second manifest is the second content name corresponding to the fourth command; and transmits the second manifest to the local application.

In some embodiments, in response to determining that the content is not available in the local cache or the storage device accessible to the computer system, the system generates a set of interests for the member content objects in the second manifest, wherein the interests include the names for the member content objects in the second manifest, wherein the interests are transmitted to the remote device. The system receives the corresponding member content objects. The system transmits the member content objects to the local application.

In some embodiments, a component associated with the remote device serves as an interface between a remote application and a portal instance associated with a transport stack of the remote device.

In some embodiments, the computer system is a component that serves as an interface between the local application and a portal instance associated with a transport stack. The component, the local application, and the transport stack reside on a same computing device.

In some embodiments, in response to receiving a fifth command from the local application to create, update, or delete content based on a name for the content, the system generates an interest with the content name and a payload that includes a command to create, update, or delete content, wherein the payload further includes authentication information. The interest is transmitted to a remote device and received by a remote component that serves as an interface between a remote application and a portal instance associated with a transport stack of the remote device. The authentication information is used by the remote component to: authenticate the computer system; and create, update, or delete the content based on the content name as indicated in the fifth command.

In some embodiments, the system determines whether a requesting entity may access the content associated with the first manifest based on the access control information included in the first command and further based on one or more of: a storage or media device accessible to the computer system; a set of system permissions indicated in a data structure accessible to the computer system; a local keychain accessible to the computer system; and a third party service for providing identity-related data and verification.

BRIEF DESCRIPTION OF THE FIGURES

FIG. 3 presents a table showing a mapping of CRUD commands to a single interface API in an information and data framework, in accordance with an embodiment of the present invention.

In the figures, like reference numerals refer to the same figure elements.

DETAILED DESCRIPTION

Figure 1:
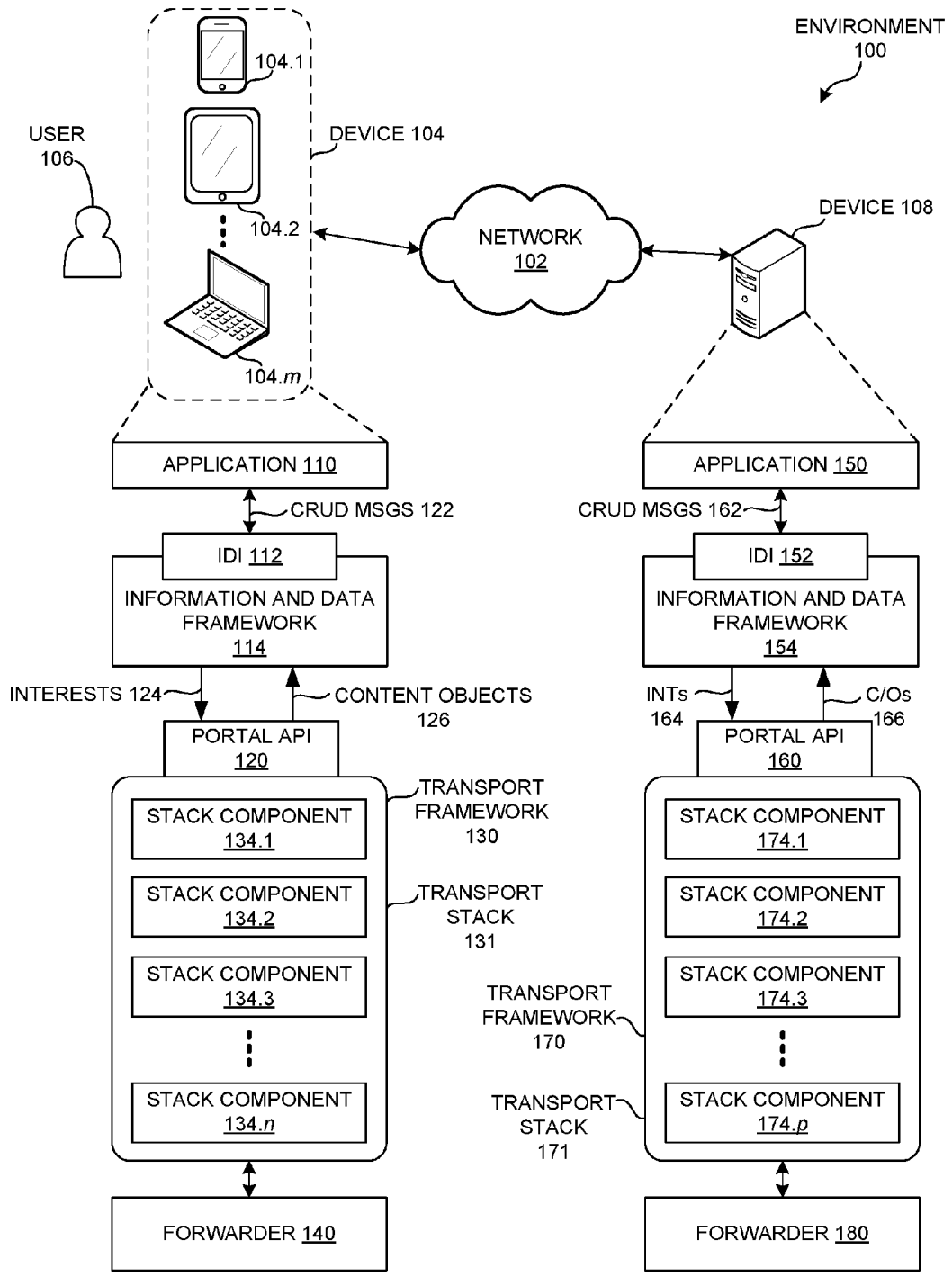
FIG. 1 illustrates an exemplary environment which facilitates a single interface for file I/O and network communication, in accordance with an embodiment of the present invention.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention provide a system that provides a single, standard interface for file I/O and network communication. The interface is a part of an information and data framework ("IDF") which can be implemented as a component that resides between an application and a portal for a transport stack. This IDF interface can be referred to as the "IDI." Communication in a CCN is based on an abstraction layer in the form of requests and content responses between applications and the location where content is stored. For example, an application can communicate with a CCN Portal, which provides an application protocol interface ("API") to communicate with the transport stack and the network. The CCN Portal API enables messages to be constructed in a location-agnostic manner using discrete CCN interests and content objects. In other words, the CCN Portal API allows an application to compose, use, and maintain transport stacks and to perform discrete message operations (e.g., send interests and content objects) through the stack.

At the same time, many modern systems and applications rely on a file as a high-level abstraction upon which other data access mechanisms are implemented (e.g., video streams, databases, messages, and key-values stores). While CCN interests and content objects may serve as a vehicle for transferring raw data, there is presently no system that can rely on CCN interests and content objects as the aforementioned abstractions without another layer of indirection.

Embodiments of the present invention solve this problem with a component that sits between the application and the CCN Portal. This component—the IDF—builds on top of the CCN Portal API to provide a Create, Read, Update, and Delete ("CRUD") API. The CRUD API (e.g., the IDI) allows applications communicating with a CCN to read and manipulate data. The IDF interfaces internally with operating system processes and remote services needed to compose content objects into the file-level abstractions typically involved in, e.g., a Unix-like CRUD API. For example, the present system can provide a mapping from the Unix File API to the IDI, which facilitates a single, standard interface for file I/O and network communication (for content retrieval). Thus, the IDF may be viewed as an extension of the CCN Portal and transport stack, where the IDF uses external services and local operating system resources to perform functions and provide the CRUD API to upper-level layers in the stack.

In CCN, each piece of content is individually named, and each piece of data is bound to a unique name that distinguishes the data from any other piece of data, such as other versions of the same data or data from other sources. This unique name allows a network device to request the data by disseminating a request or an interest that indicates the unique name, and can obtain the data independent from the data's storage location, network location, application, and means of transportation. The following terms are used to describe the CCN architecture:

Content Object (or "Content Object")

A single piece of named data, which is bound to a unique name. Content Objects are "persistent," which means that a Content Object can move around within a computing device, or across different computing devices, but does not change. If any component of the Content Object changes, the entity that made the change creates a new Content Object that includes the updated content, and binds the new Content Object to a new unique name.

Unique Names: A name in a CCN is typically location independent and uniquely identifies a Content Object. A data-forwarding device can use the name or name prefix to forward a packet toward a network node that generates or stores the Content Object, regardless of a network address or physical location for the Content Object. In some embodiments, the name may be a hierarchically structured variable-length identifier (HSVLI). The HSVLI can be divided into several hierarchical components, which can be structured in various ways. For example, the individual name components parc, home, ccn, and test.txt can be structured in a left-oriented prefix-major fashion to form the name "/parc/home/ccn/test.txt." Thus, the name "/parc/home/ccn" can be a "parent" or "prefix" of "/parc/home/ccn/test.txt." Additional components can be used to distinguish between different versions of the content item, such as a collaborative document. The HSVLI can also include contiguous name components ordered from a most general level to a most specific level.

In some embodiments, the name can include an identifier, such as a hash value that is derived from the Content Object's data (e.g., a checksum value) and/or from elements of the Content Object's name. A description of a hash-based name is described in U.S. patent application Ser. No. 13/847,814, which is herein incorporated by reference. A name can also be a flat label. Hereinafter, "name" is used to refer to any name for a piece of data in a name-data network, such as a hierarchical name or name prefix, a flat name, a fixed-length name, an arbitrary-length name, or a label (e.g., a Multiprotocol Label Switching (MPLS) label).

Interest (or "Interest"): A packet that indicates a request for a piece of data, and includes a name (or a name prefix) for the piece of data. A data consumer can disseminate a request or Interest across an information-centric network, which CCN/NDN routers can propagate toward a storage device (e.g., a cache server) or a data producer that can provide the requested data to satisfy the request or Interest.

In addition, "LCI" or "lci" refers to labeled content information and is a Universal Resource Indicator (URI) compliant identifier in which name segments carry a label. Network protocols such as CCN can use labeled content information by applying specific labels to each name segment of a URI. In a hierarchically structured name, a labeled content name assigns a semantic type or label to each segment. For example, a type of name segment can include a name segment which is a generic name segment that includes arbitrary octets, which allows a CCN to use a binary on-the-wire representation for messages.

The methods disclosed herein are not limited to CCN networks and are applicable to other architectures as well. A description of a CCN architecture is described in U.S. patent application Ser. No. 12/338,175, which is herein incorporated by reference.

Exemplary Network and Communication

FIG. 1 illustrates an exemplary environment 100 which facilitates a single interface for file I/O and network communication, in accordance with an embodiment of the present invention. Computing environment 100 can include a computer network 102, such as a CCN. Environment 100 can also include a user 106 associated with a local computing device 104 and a remote computing device 108. Devices 104 and 108 can have internal transport stacks (e.g., associated with transport frameworks 130 and 170, respectively) that exchange network packets with each other over network 102.

Device 104 can include any computing device coupled to network 102, such as a smartphone 104.1, a tablet computer 104.2, and/or a server or personal computer 104.m. Specifically, device 104 can include an application 110, an information and data framework interface ("IDI") 112 for an information and data framework ("IDF") 114, a portal API 120, a transport framework 130, and a forwarder 140. Device 104, via application 110, can perform file I/O and network communication by spending CRUD messages 122 (e.g., create, read, update, and delete file I/O commands) to IDF 114, which messages are received via IDI 112. Based on CRUD messages 122, IDF 114 can generate and transmit interests 124 to network 102 via portal API 120 and transport framework 130. Interests 124 can be sent through internal stack components 134.1-134.n of an associated transport stack 131, and on to forwarder 140. Note that transport framework 130 can include one or more transport stacks which each include multiple stack components or communication modules. In FIG. 1, transport framework 130 depicts a single transport stack (e.g., transport stack 131). Additionally, a single transport stack (e.g., transport stack 131) is associated with a single portal API instance (e.g., portal API 220).

Forwarder 140 (e.g., a network interface card, or a router in a local area network) of device 104 can transfer packets between a stack (and individual stack components) of transport framework 130 and network 102. For example, forwarder 140 can transmit or forward interests 124 via network 102 to the appropriate next-hop node based on information in its forwarding information base (FIB). Forwarder 140 can also receive content objects 126 in response to interests 124, and pass content objects 126 back to application 110 via portal API 120 and IDF 114. IDF 114 can then pass appropriate return CRUD messages 122 via IDI 112 back to application 110.

Device 108 can include any computing device coupled to network 102, such as a server, an end host device, a content producing device, or a storage server. Specifically, device 108 can include an application 150, an IDI 112 for an IDF 154, a portal API 160, a transport framework 170 (which includes a single transport stack 171), and a forwarder 180. Device 108, via application 150, can perform file I/O and network communication by sending CRUD message 162 to IDF 154 via IDI 152. Based on CRUD messages 162, IDF 154 can generate and transmit interests 164 to network 102 via portal API 160 and transport framework 170. Interests 164 can be sent through internal stack components 174.1-174.p of associated transport stack 171, and on to forwarder 180. Forwarder 180 can then transmit or forward interests 164 via network 102 to the appropriate next-hop node based on information in its FIB. Forwarder 180 can also receive content objects 166 in response to interests 164 and pass content objects 166 back to application 150 via portal API 160 and IDF 154. IDF 154 can then pass appropriate return CRUD messages 162 via IDI 152 back to application 150.

IDFs 114 and 154 can also receive an interest, respectively, via portal API 120 and portal API 160, and return a responsive content object back via the same respective portals without involving the upper application layer (e.g., applications 110 and 150, respectively). In this way, a device can act as a consumer or a producer (as depicted in relation to FIGS. 4A and 4B) or a remote storage node (as depicted in relation to FIG. 4C).

Exemplary Information and Data Framework

Figure 2:
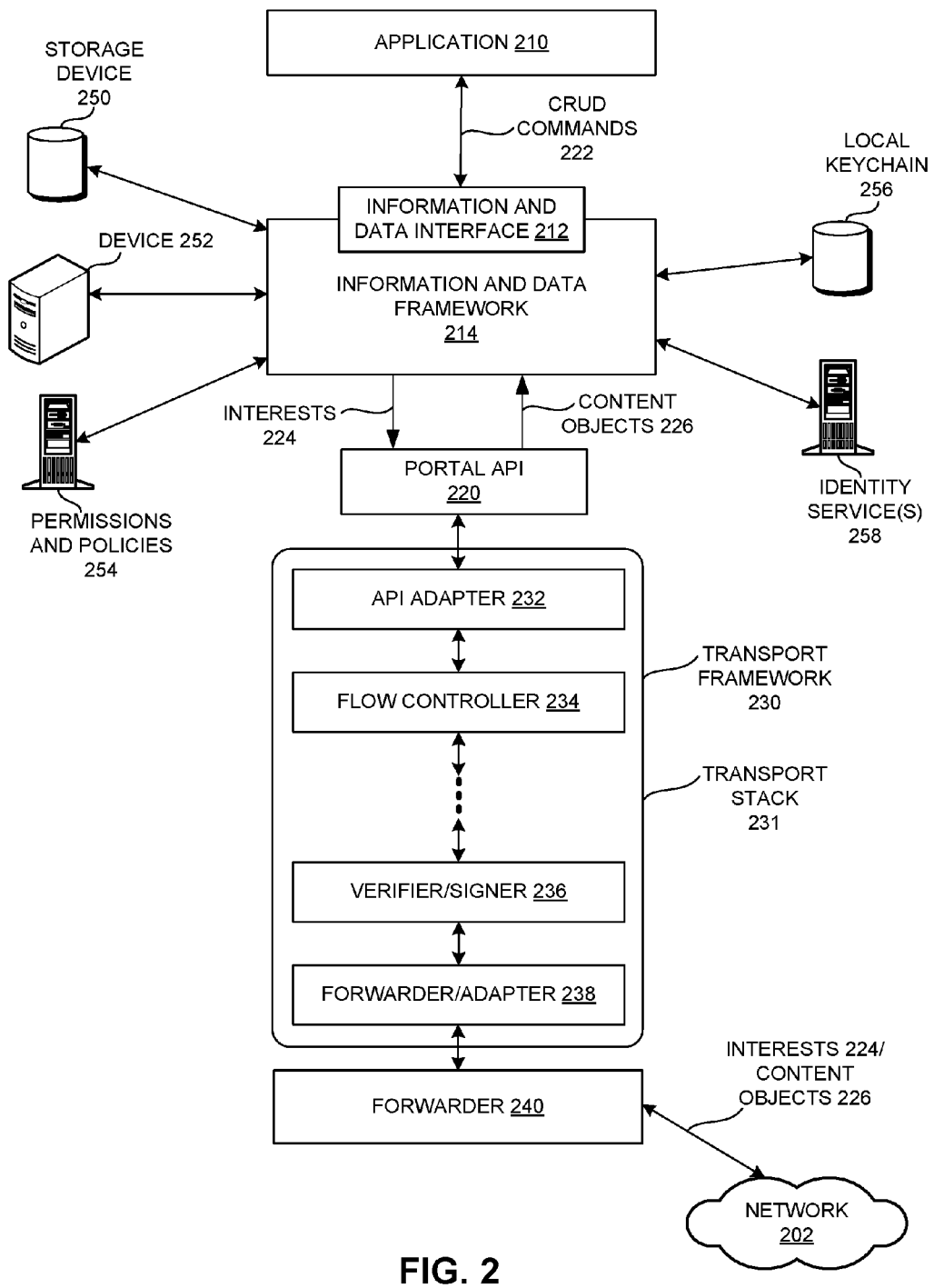
FIG. 2 illustrates an exemplary information and data framework which facilitates a single interface for file I/O and network communication, in accordance with an embodiment of the present invention.

FIG. 2 illustrates an exemplary information and data framework which facilitates a single interface for file I/O and network communication, in accordance with an embodiment of the present invention. Application 210 can reside in any computing device (e.g., device 104 or 108 as described in relation to FIG. 1). Application 210 can perform file I/O and network communications via a single standard interface: an information and data interface ("IDI") 212 of an information and data framework ("IDF") 214. IDF 214 can interface with a local operating system to access physically attached devices or resources, such as a storage device 250, a computing device 252, a permissions and policies server 254, and a local keychain data store 256. IDF 214 can coordinate with these resources to determine whether upper-level clients can perform, e.g., read and write commands. IDF 214 can also communicate with external services, such as an identity service(s) 258, to obtain authentication information and other related data. These external services may also provide cryptographic secrets needed to access content protected under a form of access control (e.g., encrypted data).

Application 210 can communicate over a network 202 by sending CRUD commands 222 via IDI 212 of IDF 214. IDF 214 can coordinate with its locally attached devices (e.g., to verify a permission or policy) or external services (e.g., to obtain authentication information). Based on CRUD commands 222 and any other obtained information, IDF 214 can generate and transmit interests 224 to network 202 via portal API 220 and transport framework 230. Interests 224 can pass through internal stack components of a transport stack 231 of transport framework 230. Transport framework 230 can include one or more transport stacks which each include multiple stack components or communication modules. In FIG. 2, transport framework 230 depicts one transport stack (e.g., a transport stack 231) which includes stack components 232, 234, 236, and 238. An API adapter 232 can communicate between an API and a specific transport stack of transport framework 230. A flow controller 234 can shape and manage traffic, pipeline and transmit interests, and order content objects. A verifier/signer 236 can encode and sign content objects destined for a network element, decode and verify content objects destined for the application, encode interests destined for a network element, and decode interests destined for the application. A forwarder/adapter 238 can communicate with a forwarder 240. Forwarder 240 can communicate with other forwarders over network 202, including by forwarding interests 224. Other stack components (not shown) can include functionality related to security (e.g., encryption, decryption, authentication, data signing, signature verification, trust assessment, and filtering), data-processing (e.g., encoding, decoding, encapsulating, decapsulating, transcoding, compression, extraction, and decompression), and storage (e.g., data storage, data retrieval from storage, deduplication, segmentation, and versioning).

Forwarder 240 can also receive content via network 202. For example, forwarder 240 can receive and pass content objects 226 through stack 231 to IDF 214 via portal API 220. IDF 214 can process content objects 226 as needed (e.g., by storing content objects 226 in locally attached storage device 250 or a local cache, or by authenticating or decrypting content objects 226). IDF 214 can subsequently pass content corresponding to content objects 226 back to application 210 via IDI 212 as responsive CRUD commands 222.

In some embodiments, application 210 can send CRUD commands 222 relating to indicated data based on a name, and the indicated data may already reside in a local cache or a storage device locally attached to IDF 214. In this case, instead of generating interests 224 and receiving content objects 226 (as described above), IDF 214 performs the requested CRUD commands 222 on the local data and returns the appropriate responsive CRUD commands 222 back to application 210.

Thus, IDF 214, via IDI 212, provides a system that facilitates a single, standard interface for file I/O and network communication. Any application residing on any device (e.g., a client computing device, a content producing device, a storage server, etc.) can generate a CRUD command in a CCN, which allows the system to perform both file manipulation (e.g., via CRUD commands 222) and network communication (e.g., by transmitting interests 224 to network 202 based on CRUD commands 222 as received via IDI 212 of IDF 214).

Exemplary CRUD API

FIG. 3 presents a table 300 showing a mapping of CRUD commands to a single interface API in an information and data framework, in accordance with an embodiment of the present invention. Table 300 includes entries with the following three fields: a CRUD command 302 field, which specifies the CRUD command; a function signature 304 field, which specifies an exemplary format for the specified CRUD command; and a description 306 field, which indicates the purpose and use of the specified CRUD command, including the respective input and output.

Table 300 can include a create 312 command, which is a command to make a file available with the given LCI encoded name and access information as encoded in a CCN AccessControlSpecification ("ACS") object. An exemplary format of the create 312 command is: "(success, manifest) =IDFCreate(lciName, ACS)," where the terms are defined as follows: "success" is an indicator of whether the create command is successful, e.g., whether the file by the name of "lciName" with "ACS" access control is successfully created; "manifest" is a collection of data that represents the file by the name of "lciName" requested to be created; "IDFCreate" is the file command to create data; "lciName" is the CCN name corresponding to the content to be created, and can be an HSVLI; and "ACS" is a CCN AccessControl-Specification object that includes access information regarding how the content may be accessed.

Table 300 can also include a read 314 command, which is a command to read data of a certain size from the given LCI encoded name starting at a given offset. An exemplary format of the read command is: "buffer=IDFRead(lciName, numbytes=0, offset=0)," where the terms are defined as follows: "buffer" contains the result of the data requested to be read; "IDFRead" is the file command to read data; "lciName" is the CCN name corresponding to the content to be read; "numbytes" is the number of bytes of data to be read; and "offset" indicates the offset from which the data should be read.

Table 300 can also include an update 316 command, which is a command to update a file of the given LCI encoded name with the specified data starting at a given offset. An exemplary format of the update command is: "count=IDFUpdate(lciName, buffer, count, offset=0)," where the terms are defined as follows: "count" is an indicator provided in the command and returned back to the requester for subsequent use in indicating a successful update; "IDFUpdate" is the file command to update data; "lciName" is the CCN name corresponding to the content to be updated; "buffer" contains the new data for the update; "count" is the indicator provided in the command and returned back to the requester for subsequent use in indicating a successful update; and "offset" indicates the offset from which the data should be updated.

Table 300 can also include a delete 318 command, which is a command to delete a file of the given LCI encoded name, or to make unavailable a file that was previously available. An exemplary format of the delete command is: "success=IDFDelete(lciName)," where the terms are defined as follows: "success" is an indicator of whether the delete command is successful; and "lciName" is the CCN name corresponding to the content to be deleted.

Exemplary Communication Between Producer and Consumer/Storage

Figure 4A:
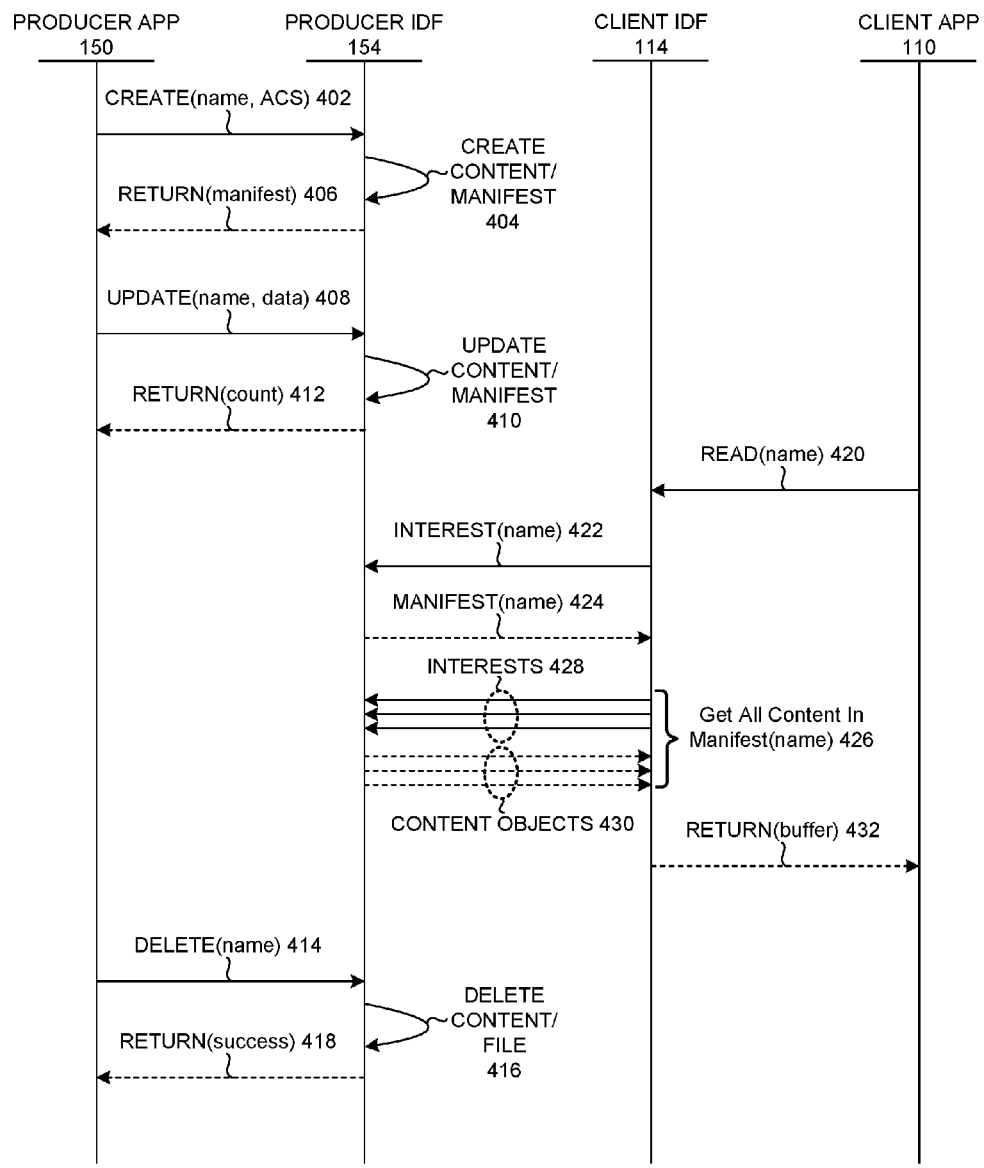
FIG. 4A presents an exemplary communication between a producer application, a producer IDF, a client IDF, and a client application, where the client application generates a command to read content, in accordance with an embodiment of the present invention.

FIG. 4A presents an exemplary communication 400 between a producer application 150, a producer IDF 154, a client IDF 114, and a client application 110, where client application 110 generates a command to read content, in accordance with an embodiment of the present invention. Producer application 150, producer IDF 154, client IDF 114, and client application 110 can correspond to the same entities depicted in FIG. 1. Producer application 150 can generate a "CREATE(name, ACS)" 402 command, which is received by producer IDF 154 (via producer IDI 152, not shown in FIG. 4A). IDF 154 can perform a create content/manifest function 404. IDF154 can create the content corresponding to the lciName or CCN name "name" by creating a manifest with a name of "name," where the manifest is a collection of content objects indicated by their respective names and digests. CCN manifests, including aggregate signing for processing efficiency and subsequent verification, is described in U.S. patent application Ser. No. 14/231, 515. IDF 154 can subsequently return the created content/manifest to producer application 150, as shown by the dotted line representing the return of the data in a "RETURN (manifest)" 406 communication. Communication 406 can also include an indicator of success for creating the requested data.

Producer application 150 can also generate an "UPDATE (name, data)" 408 command, which is received by producer IDF 154. IDF 154 can perform an update content/manifest function 410 of the data corresponding to the CCN name "name" by writing the new data contained in "data." Command 408 can also include an offset within the "name" file from which to begin writing "data," as well as a "count" which can be subsequently returned to indicate success in updated the requested data. IDF 154 can subsequently return the "count" to producer application 150, as shown by the dotted line representing the return of the indicator in a "RETURN(count")" 412 communication.

Client application 110 can generate a "READ(name)" 420 command, which is received by client IDF 114 (via client IDI 112, not shown in FIG. 4A). IDF 114 can generate an "INTEREST(name)" 422 for the data by the CCN name of "name." Interest 422 may travel via a forwarder and through a network before arriving at producer IDF 154 (as described in relation to FIG. 1). Producer IDF 154 can determine that it has access to the data by the name "name" (e.g., either in a local cache or a locally attached or accessible storage device), and return the data in a "MANIFEST(name)" 424 communication back to client IDF 114. Client IDF 114 can determine that the returned content is a manifest, and perform a "Get All Content in Manifest(name)" function 426. For example, IDF 114 can recursively obtain the data for all content objects pointed to by a root manifest (e.g., by sending a set of interests 428). IDF 114 may use a predefined policy for concatenating or merging data partitions into a single piece of data over which clients can iterate. IDF 114 can subsequently receive the responsive content objects 430. IDF 114 can also decrypt any encrypted data by determining the necessary information from the ACS field of the manifest. The ACS field (or object) may include information to identify the access policy controls applicable for the content and to obtain or retrieve the appropriate cryptographic keys from, e.g., external identity service(s) 258 of FIG. 2. Finally, IDF 114 can return the manifest or data in a buffer to client application 110, as shown by the dotted line representing the return of the data in a "RETURN(buffer")" 432 communication. Note that the initial read command 420 can also include a number of bytes of data to read from the file "name" and an offset within the file "name" from which to start reading.

Producer application 150 can also generate a "DELETE (name)" 414 command, which is received by producer IDF 154. IDF 154 can perform a delete content/file function 416 of the data corresponding to the name "name" by deleting the file corresponding to the CCN name "name." IDF 154 can subsequently return a "success" indicator to producer application 150, as shown by the dotted line representing the return of the indicator in a "RETURN(success")" 418 communication.

Any network node or entity that has access to content to create, publish, update, or delete can generate a CRUD command to create, update, or delete the content. Any network node or entity can generate a CRUD command to read content from a file or retrieve content from the network. For example, a producer node (e.g., via producer application 150) can create, update, and delete data of name "name," while a consumer node (e.g., via client application 110) can read data of name "name."

Figure 4B:
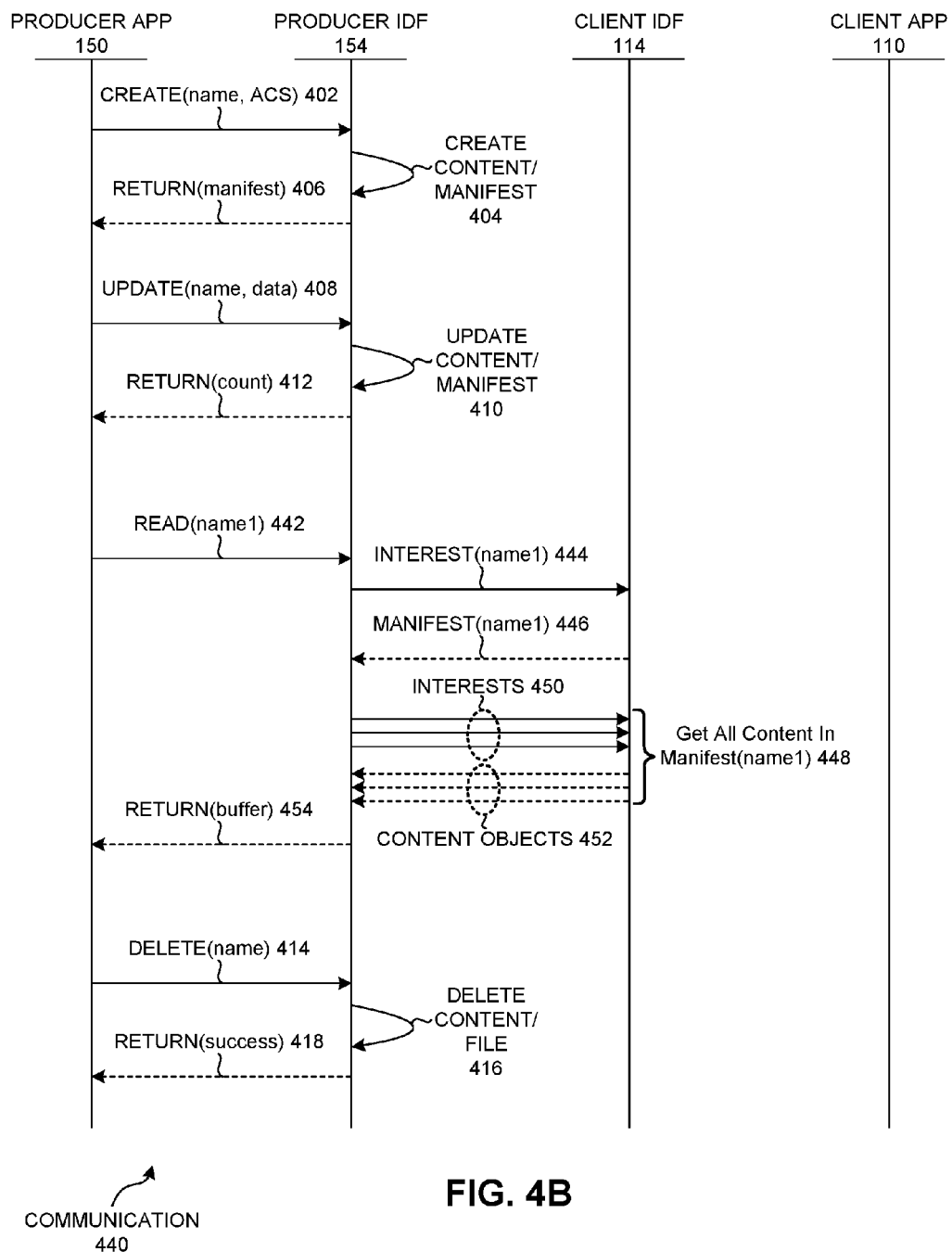
FIG. 4B presents an exemplary communication between a producer application, a producer IDF, a client IDF, and a client application, where the producer application generates a command to read content, in accordance with an embodiment of the present invention.

At the same time, a client node or an intermediate node can also act as a producer node that can fulfill a read request (e.g., if the requested content exists in a local cache, content store, or other device accessible to the client node or the intermediate node. For example, FIG. 4B presents an exemplary communication 440 between a producer application 150, a producer IDF 154, a client IDF 114, and a client application 110, where producer application 150 generates a command to read content, in accordance with an embodiment of the present invention. The create, update, and delete communication flows (e.g., 402-406, 408-412, and 414-418, respectively) are the same as depicted and described in relation to communication 400 of FIG. 4A. The main difference between FIGS. 4A and 4B is that in FIG. 4A, client application 110 is the network entity that generates the read command (for data of name "name," which data is previously created by producer application 150), whereas in FIG. 4B, producer application 150 is the network entity that generates the read command (for data of name "name1"). Thus, FIG. 4B illustrates the case where the client application or node acts as a producer node for producer application 150.

During operation, producer application 150 can generate a "READ(name1)" 442 command, which is received by producer IDF 154 (via producer IDI 152, not shown in FIG. 4B). IDF 154 can generate an "INTEREST(name1)" 444 for the data by the CCN name of "name1." Interest 444 may travel via a forwarder and through a network before arriving at client IDF 114. Client IDF 114 can determine that it has access to the data by the name "name1" (e.g., either in a local cache or a locally attached or accessible storage device), and return the data in a "MANIFEST(name1)" 446 communication back to producer IDF 154. Producer IDF 154 can determine that the returned content is a manifest, and perform a "Get All Content in Manifest(name1)" function 448. For example, IDF 154 can recursively obtain the data for all content objects pointed to by a root manifest (e.g., by sending a set of interests 450). IDF 154 may use a predefined policy for concatenating or merging data partitions into a single piece of data over which clients can iterate. IDF 154 can subsequently receive the responsive content objects 452. IDF 154 can also decrypt any encrypted data by determining the necessary information from the ACS field of the manifest. Finally, IDF 154 can return the manifest or data in a buffer to producer application 150, as shown by the dotted line representing the return of the data in a "RETURN(buffer)" 454 communication. Note that the initial read command 442 can also include a number of bytes of data to read from the file "name1" and an offset within the file "name1" from which to start reading.

Figure 4C:
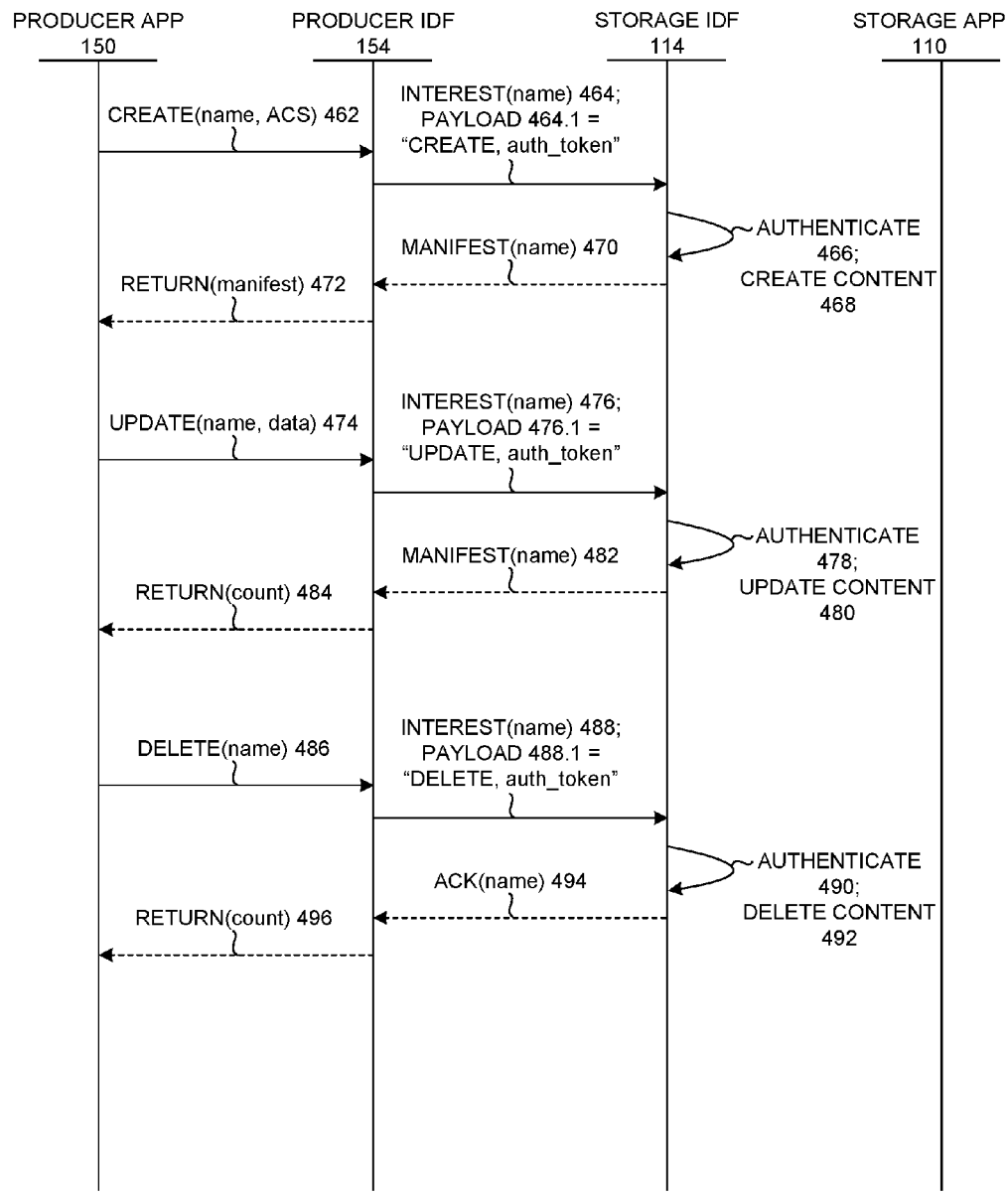
FIG. 4C presents an exemplary communication between a producer application, a producer IDF, a storage IDF, and a storage application, where the communication includes an authentication process, in accordance with an embodiment of the present invention.

In FIG. 4A, the indicated data (e.g., the content that is created, updated, deleted, and read) is stored either in a local cache or a locally accessible storage device of the producer node, based on the name specified in the respective CRUD command. In some embodiments, the indicated data may not be stored locally. For example, the producer node can create, store, update, and delete files on remote machines (e.g., storage server 114 as depicted in FIG. 1) using the same CRUD functions. The producer node may be required to provide proper authentication to the storage server. FIG. 4C presents an exemplary communication 460 between a producer application 150, a producer IDF 154, a storage IDF 114, and a storage application 110, where communication 460 includes an authentication process, in accordance with an embodiment of the present invention.

During operation, producer application 150 can generate a "CREATE(name, ACS)" 462 command, which is received by producer IDF 154 (via producer IDI 152, not shown in FIG. 4A). IDF 154 can determine that the command is to be sent to another network entity (e.g., a remote storage server such as device 108 of FIG. 1), and generate an "INTEREST (name)" 464 interest with a payload 464.1 of "CREATE, auth_token." Interest 464 indicates a request to create data by the name "name" and further request indicates an authentication token ("auth_token") for use by the storage server to authenticate the producer node. Storage IDF 114 can receive interest 464 and perform an authenticate function 466 based on the included authentication token. Storage IDF 114 can create the content requested in interest 464 (create content function 468). Storage IDF 114 may or may not communicate with storage application 110 to perform functions 466 and 468. Storage IDF 114 may create the content in the form of a manifest, and can subsequently return the manifest to producer application IDF 154, as shown by the dotted line representing the return of the data in a "MANIFEST(name)" 470 communication. Producer IDF 154 can then return the data to producer application 150 in a "RETURN(manifest)" 472 communication. Communication 472 can also include an indicator of success in creating the requested data.

While communication 460 of FIG. 4C depicts the inclusion of an authentication token in interest 464, producer IDF 154 and storage IDF 114 may participate in an authentication process via other methods, such as by a previously shared symmetric key, the use of a digital certificate granted by a trusted third party authentication or signature service, or other similar method.

Similarly, producer application 150 can generate an "UPDATE(name, data)" 474 command, which is received by producer IDF 154. IDF 154 can generate an "INTEREST (name)" 476 interest with a payload 476.1 of "UPDATE, auth_token." Interest 476 indicates a request to update data by the name "name" and further indicates the authentication token. Storage IDF 114 can receive interest 476 and perform an authenticate function 478 based on the included authentication token. Storage IDF 114 can update the content requested in interest 476 (update content function 480). Storage IDF 114 may or may not communicate with storage application 110 to perform functions 478 and 480. Storage IDF 114 can subsequently return the updated manifest to producer application IDF 154, as shown by the dotted line representing the return of the data in a "MANIFEST(name)" 482 communication. Producer IDF 154 can then return the data to producer application 150 in a "RETURN(count)" 484 communication.

In addition, producer application 150 can generate a "DELETE(name)" 486 command, which is received by producer IDF 154. IDF 154 can generate an "INTEREST (name)" 488 interest with a payload 488.1 of "DELETE, auth_token." Interest 488 indicates a request to delete data by the name "name" and further indicates the authentication token. Storage IDF 114 can receive interest 488 and perform an authenticate function 490 based on the included authentication token. Storage IDF 114 can delete the content requested in interest 488 (delete content function 492). Storage IDF 114 may or may not communicate with storage application 110 to perform functions 490 and 492. Storage IDF 114 can subsequently return an acknowledgment of the deletion command to producer application IDF 154, as shown by the dotted line representing the acknowledgment in an "ACK(name)" 494 communication. Producer IDF 154 can then return an indicator of success to producer application 150 in a "RETURN(count)" 496 communication.

Role of an IDF Component in a Content Producing Device

Figure 5A:
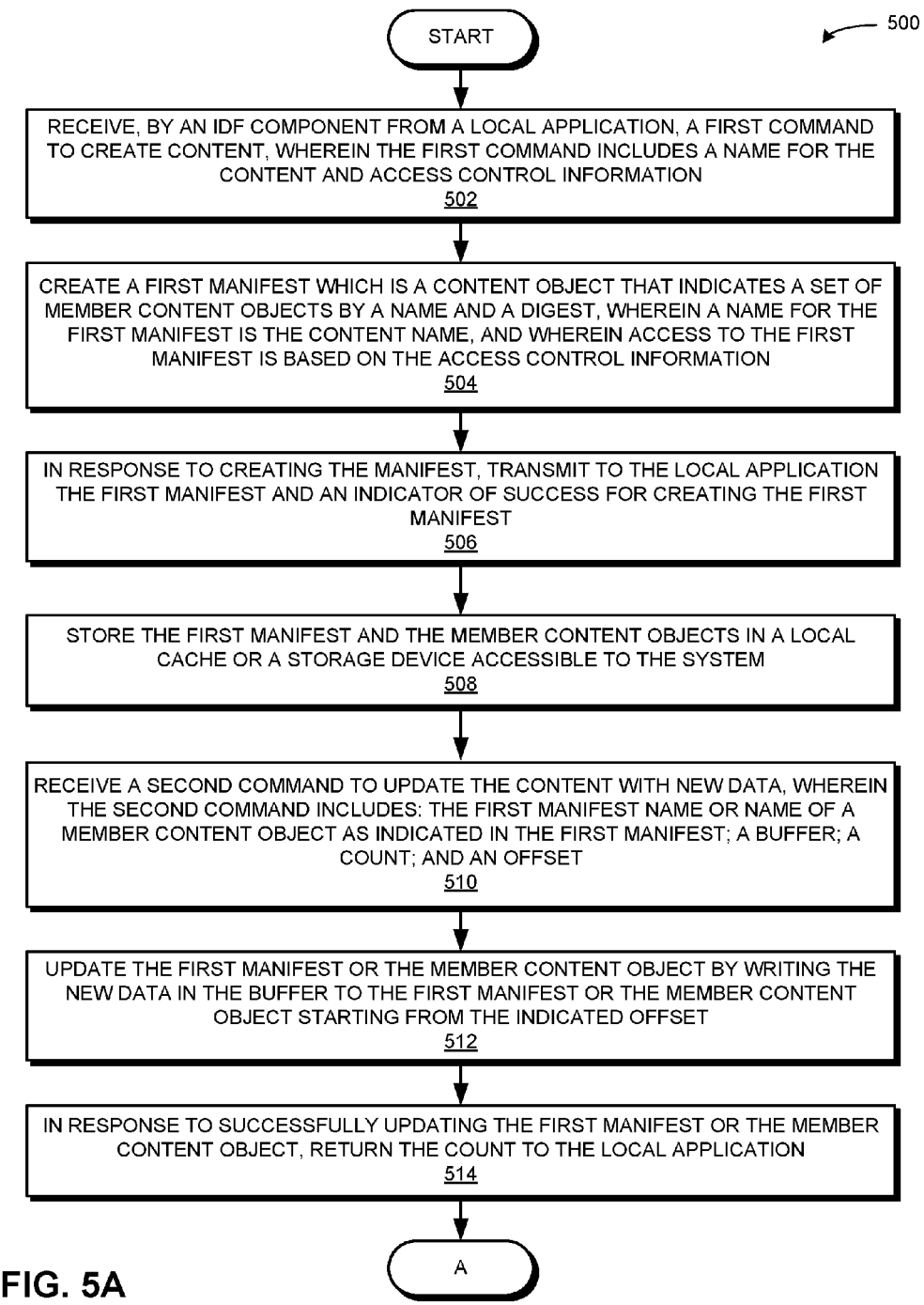
FIG. 5A presents a flow chart illustrating a method by a content producing device for facilitating a single interface for file I/O and network communication, including generating commands to create and update content, in accordance with an embodiment of the present invention.

FIG. 5A presents a flow chart 500 illustrating a method by a content producing device for facilitating a single interface for file I/O and network communication, including generating commands to create and update content, in accordance with an embodiment of the present invention. During operation, the system receives, by an IDF component of a content producing device (e.g., IDF 154) from a local application (e.g., application 150), a first command to create content, wherein the first command includes a name for the content and access control information (operation 502). The system creates a first manifest which is a content object that indicates a set of member content objects by a name and a digest, wherein a name for the first manifest is the content name corresponding to the first command, and wherein access to the first manifest is based on the access control information included in the first command (operation 504). In response to creating the manifest, the system transmits to the local application the first manifest and an indicator of success for creating the first manifest (operation 506). The system stores the first manifest and the member content objects in a local cache or a storage device accessible to the system (operation 508).

The system receives a second command to update the content with new data, wherein the second command includes: the first manifest name or a name of a member content object as indicated in the first manifest; a buffer with the new data for the update; a count for subsequent use in indicating a successful update; and an offset within the first manifest or the member content object from which the new data is to be written (operation 510). The system updates the first manifest or the member content object by writing the new data in the buffer to the first manifest or the member content object starting from the indicated offset (operation 512). In response to successfully updating the first manifest or the member content object, the system returns the count to the local application (operation 514). The operation continues as described at Label A of FIG. 5B.

Figure 5B:
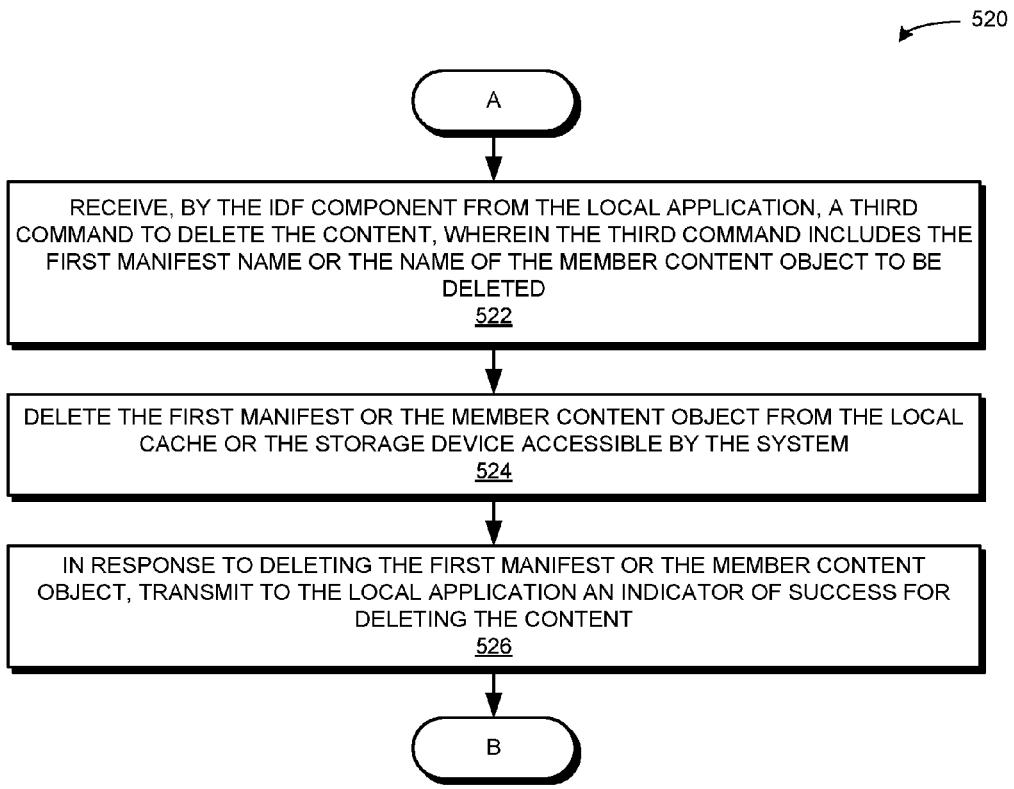
FIG. 5B presents a flow chart illustrating a method by a content producing device for facilitating a single interface for file I/O and network communication, including generating a command to delete content, in accordance with an embodiment of the present invention.

FIG. 5B presents a flow chart 520 illustrating a method by a content producing device for facilitating a single interface for file I/O and network communication, including generating a command to delete content, in accordance with an embodiment of the present invention. During operation, the system receives, by the IDF component of the content producing device from the local application, a third command to delete the content, wherein the third command includes the first manifest name or the name of the member content object to be deleted (operation 522). The system deletes the first manifest or the member content object from the local cache or the storage device accessible by the system (operation 524). In response to deleting the first manifest or the member content object, the system transmits to the local application an indicator of success for deleting the content (operation 526).

Figure 5C:
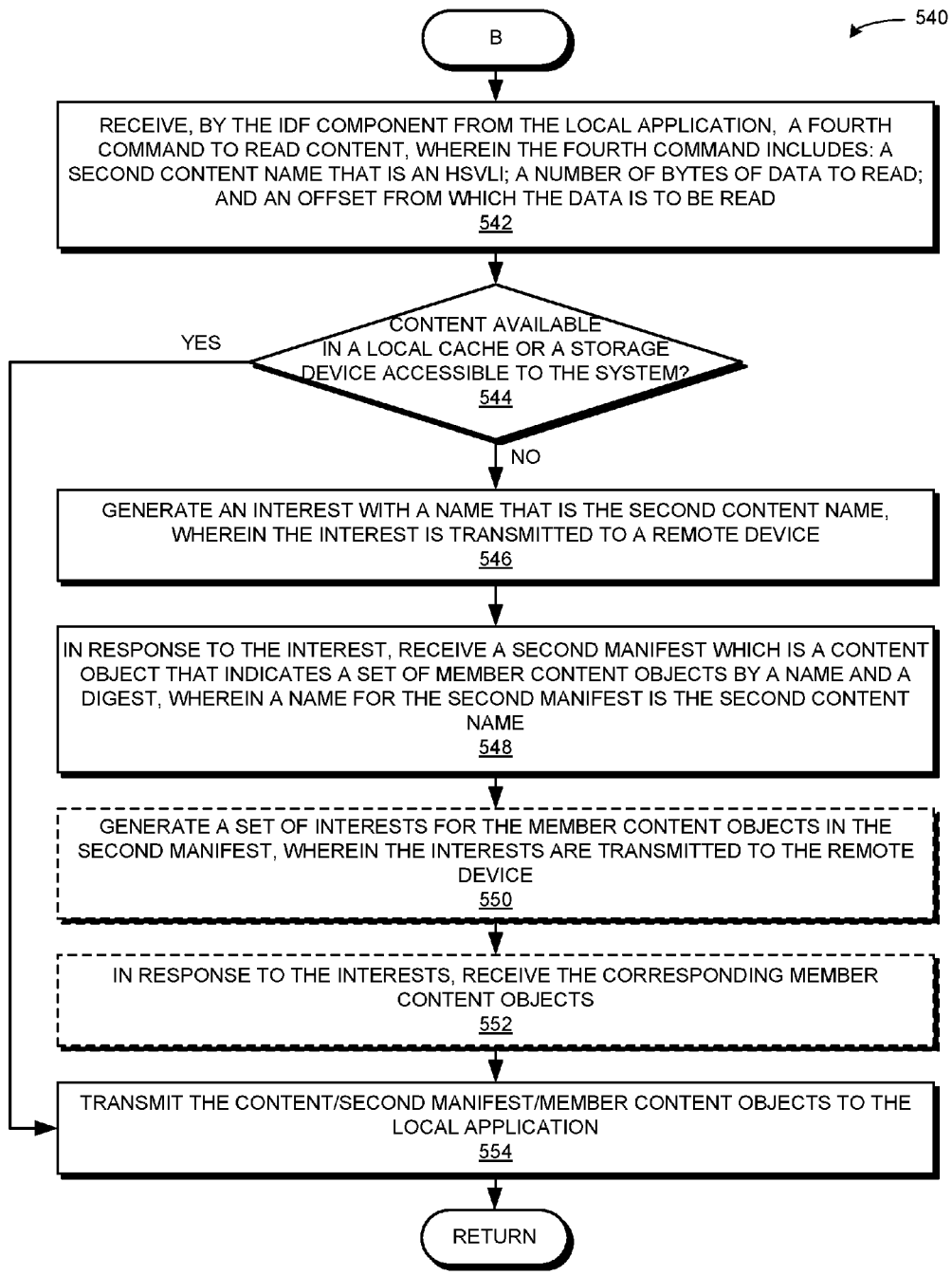
FIG. 5C presents a flow chart illustrating a method by a content producing device for facilitating a single interface for file I/O and network communication, including generating a command to read content, in accordance with an embodiment of the present invention.

FIG. 5C presents a flow chart 540 illustrating a method by a content producing device for facilitating a single interface for file I/O and network communication, including generating a command to read content, in accordance with an embodiment of the present invention. During operation, the system receives, by the IDF component of the content producing device from the local application, a fourth command to read content, wherein the fourth command includes: a second content name that is an HSVLI; a number of bytes of data to read; and an offset from which the data is to be read (operation 542). The system determines whether the requested content is available in a local cache or a storage device accessible to the system (decision 544). If it is, the system transmits the content to the local application (operation 554). If it is not, the system generates an interest with a name that is the second content name, where the interest is transmitted to a remote device (operation 546). In response to the interest, the system receives a second manifest which is a content object that indicates a set of member content objects by a name and a digest, where a name for the second manifest is the second content name corresponding to the fourth command (operation 548). The system can generate a set of interests for the member content objects in the second manifest, where the interests are transmitted to the remote device (operation 550). In response to the interests, the system can receive the corresponding member content objects (operation 552). Finally, the system transmits the second manifest or the member content objects to the local application (operation 554).

Exemplary Computer System

Figure 6:
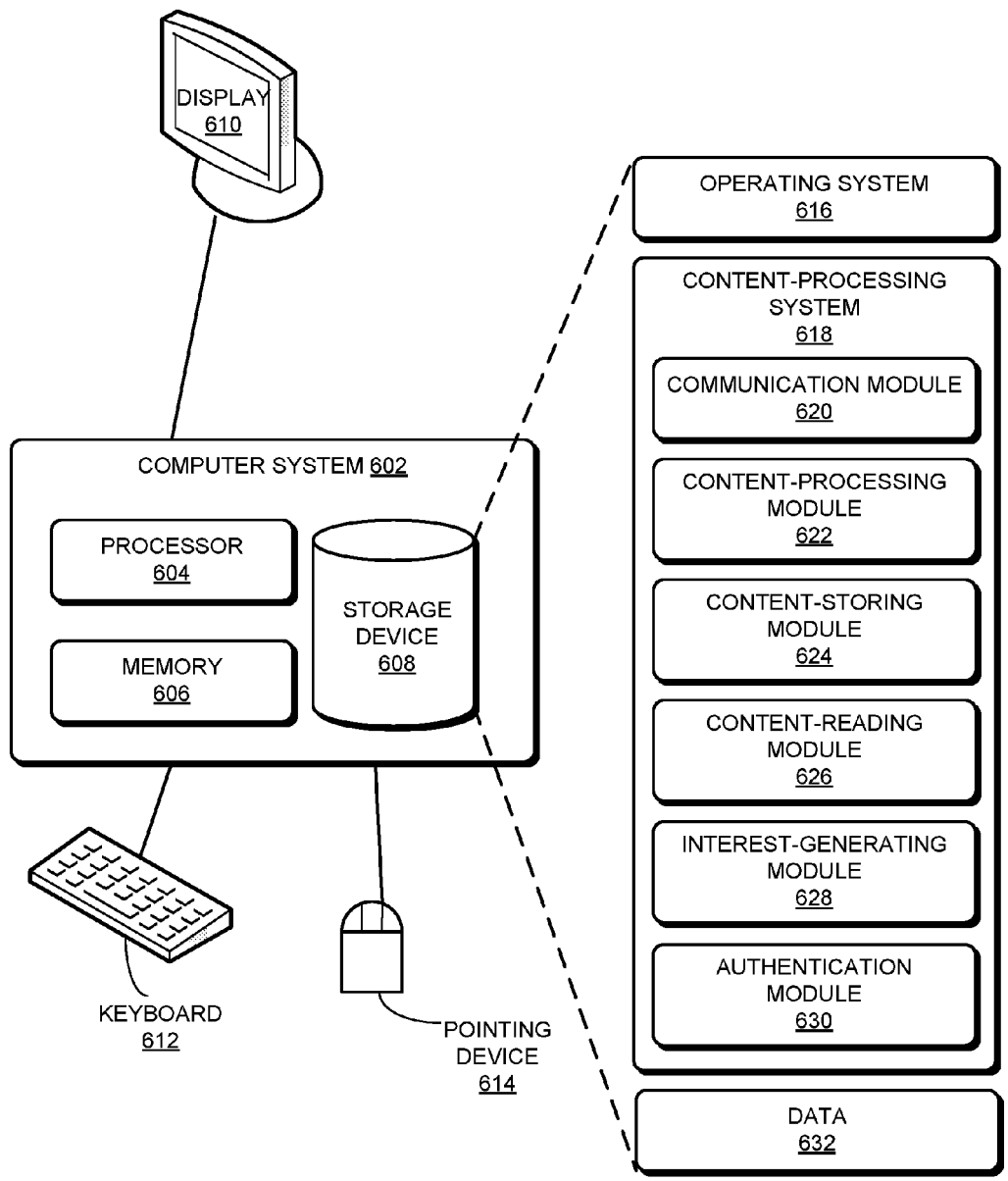
FIG. 6 illustrates an exemplary computer system that facilitates a single interface for file I/O and network communication, in accordance with an embodiment of the present invention.

FIG. 6 illustrates an exemplary computer system 602 that facilitates a single interface for file I/O and network communication, in accordance with an embodiment of the present invention. Computer system 602 includes a processor 604, a memory 606, and a storage device 608. Memory 606 can include a volatile memory (e.g., RAM) that serves as a managed memory, and can be used to store one or more memory pools. Furthermore, computer system 602 can be coupled to a display device 610, a keyboard 612, and a pointing device 614. Storage device 608 can store an operating system 616, a content-processing system 618, and data 628.

Content-processing system 618 can include instructions, which when executed by computer system 602, can cause computer system 602 to perform methods and/or processes described in this disclosure. Specifically, content-processing system 618 may include instructions for sending and/or receiving data packets to/from other network nodes across a computer network, such as a content centric network, and for transmitting packets between an application, an IDF component, a CCN portal, a transport stack, and a forwarder residing on the same computing device (communication module 620). A data packet can include an interest packet or a content object packet with a name that is an HSVLI. Further, content-processing system 618 can include instructions for receiving from a local application a first command to create content, wherein the first command includes a name for the content and access control information that indicates how the content may be accessed (communication module 620).

Content-processing system 618 can also include instructions for creating a first manifest which is a content object that indicates a set of member content objects by a name and a digest, wherein a name for the first manifest is the content name corresponding to the first command, wherein access to the manifest is based on the access control information included in the first command (content-processing module 622). Content-processing system 618 can include instructions for transmitting to the local application the first manifest and an indicator of success for creating the first manifest (communication module 620). Content-processing system 618 can also include instructions for storing the first manifest and the member content objects in a local cache or a storage device accessible to the computer system (content-storing module 624).

Content-processing system 618 can further include instructions for receiving from the local application a second command to update the content with new data, wherein the second command includes the first manifest name or a name of a member content object as indicated in the first manifest, a buffer which contains the new data for the update, a count for subsequent use in indicating a successful update, and an offset within the first manifest or within the member content object from which the new data is to be written (communication module 620). Content-processing system 618 can include instructions for updating the first manifest or the member content object by writing the new data in the buffer to the first manifest or the member content object starting from the offset (content-processing module 622). Content-processing system 618 can include instructions for returning the count to the local application (communication module 620).

Content-processing system 618 can additionally include instructions for receiving from the local application a third command to delete the content, wherein the third command includes the first manifest name or the name of the member content object to be deleted (communication module 620). Content-processing system 618 can also include instructions for deleting the first manifest or the member content object from a local cache or a storage device accessible by the computer system (content-processing module 622). Content-processing system 618 can include instructions for transmitting to the local application an indicator of success for deleting the content (communication module 620).

Content-processing system 618 can include instructions for receiving a fourth command to read content, wherein the fourth command includes a second content name that is an HSVLI, a number of bytes of data to read, and an offset from which the data is to be read (communication module 620). Content-processing system 618 can include instructions for, in response to determining that the content is available in a local cache or a storage device accessible to the computer system (content-reading module 626), transmitting the content to the local application (communication module 620). Content-processing system 618 can include instructions for, in response to determining that the content is not available in the local cache or the storage device accessible to the computer system (content-reading module 626), performing the following operations: generating an interest with a name that is the second content name, wherein the interest is transmitted to a remote device (interest-generating module 628); receiving a second manifest which is a content object that indicates a set of member content objects by a name and a digest, wherein a name for the second manifest is the second content name corresponding to the fourth command (communication module 620); and transmitting the second manifest to the local application (communication module 620).

Content-processing system 618 can also include instructions for generating a set of interests for the member content objects in the second manifest (interest-generating module 628). Content-processing system 618 can include instructions for receiving the corresponding member content objects and transmitting the member content objects to the local application (communication module 620).

Content-processing system 618 can also include instructions for, in response to receiving a fifth command from the local application to create, update, or delete content based on a name for the content (communication module 620), generating an interest with the content name and a payload that includes a command to create, update, or delete content, wherein the payload further includes authentication information (interest-generating module 628). Content-processing system 618 can also include instructions for determining whether a requesting entity may access the content associated with the first manifest based on the access control information included in the first command (authentication module 630).

Data 632 can include any data that is required as input or that is generated as output by the methods and/or processes described in this disclosure. Specifically, data 632 can store at least: a name; a content name; an interest name; a name that is an HSVLI; a command; a command to create, read, delete, or update content based on a name; a manifest; one or more member content objects of the manifest indicated by a name and a digest; a manifest name; a buffer; a count; an offset; an indicator of success; a number of bytes of data to read; a local application; a portal instance; a transport or protocol stack; a component that serves as an interface between the local application and the portal instance associated with the transport stack; a transport framework; an information and data framework; an interface to the information and data framework; one or more stack components; a forwarder; and a local cache or a content store.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer system for facilitating a single interface for file I/O and network communication, the system comprising:
a processor; and
a storage device storing instructions that when executed by the processor cause the processor to perform a method, the method comprising:
receiving from a local application a first command to create content, wherein the first command includes a name for the content and access control information that indicates how the content may be accessed, wherein the content name is a hierarchically structured variable length identifier that includes contiguous name components ordered from a most general level to a most specific level;

creating a first manifest which is a content object that indicates a set of member content objects by a name and a digest, wherein a name for the first manifest is the content name corresponding to the first command, wherein access to the manifest is based on the access control information included in the first command; and transmitting to the local application the first manifest and an indicator of success for creating the first manifest, thereby facilitating an interface for the local application to process network data in a content centric network;

wherein the computer system is a component that serves as an interface between the local application and a portal instance associated with a transport stack, and wherein the component, the local application, and the transport stack reside on a same computing device.

2. The computer system of claim 1, wherein the method further comprises:

receiving from the local application a second command to update the content with new data, wherein the second command includes the first manifest name or a name of a member content object as indicated in the first manifest, a buffer which contains the new data for the update, a count for subsequent use in indicating a successful update, and an offset within the first manifest or within the member content object from which the new data is to be written;

updating the first manifest or the member content object by writing the new data in the buffer to the first manifest or the member content object starting from the offset; and returning the count to the local application.

3. The computer system of claim 1, wherein the method further comprises:

storing the first manifest and the member content objects in a local cache or a storage device accessible to the computer system.

4. The computer system of claim 1, wherein the method further comprises:

receiving from the local application a third command to delete the content, wherein the third command includes the first manifest name or the name of the member content object to be deleted;

deleting the first manifest or the member content object from a local cache or a storage device accessible by the computer system; and transmitting to the local application an indicator of success for deleting the content.

5. The computer system of claim 1, wherein the method further comprises:

receiving a fourth command to read content, wherein the fourth command includes a second content name that is a hierarchically structured variable length identifier that includes contiguous name components ordered from a most general level to a most specific level, a number of bytes of data to read, and an offset from which the data is to be read;

in response to determining that the content is available in a local cache or a storage device accessible to the computer system, transmitting the content to the local application; and in response to determining that the content is not available in the local cache or the storage device accessible to the computer system:

generating an interest with a name that is the second content name, wherein the interest is transmitted to a remote device;

receiving a second manifest which is a content object that indicates a set of member content objects by a name and a digest, wherein a name for the second manifest is the second content name corresponding to the fourth command; and transmitting the second manifest to the local application.

6. The computer system of claim 5, wherein in response to determining that the content is not available in the local cache or the storage device accessible to the computer system, the method further comprises:

generating a set of interests for the member content objects in the second manifest, wherein the interests include the names for the member content objects in the second manifest, wherein the interests are transmitted to the remote device;

receiving the corresponding member content objects; and transmitting the member content objects to the local application.

7. The computer system of claim 5, wherein a component associated with the remote device serves as an interface between a remote application and a portal instance associated with a transport stack of the remote device.

8. The computer system of claim 1, wherein the method further comprises:

in response to receiving a fifth command from the local application to create, update, or delete content based on a name for the content, generating an interest with the content name and a payload that includes a command to create, update, or delete content, wherein the payload further includes authentication information, wherein the interest is transmitted to a remote device and received by a remote component that serves as an interface between a remote application and a portal instance associated with a transport stack of the remote device, and wherein the authentication information is used by the remote component to:

authenticate the computer system; and create, update, or delete the content based on the content name as indicated in the fifth command.

9. The computer system of claim 1, wherein the method further comprises determining whether a requesting entity may access the content associated with the first manifest based on the access control information included in the first command and further based on one or more of:

a storage or media device accessible to the computer system;

a set of system permissions indicated in a data structure accessible to the computer system; a local keychain accessible to the computer system; and a third party service for providing identity-related data and verification.

10. A computer-implemented method for facilitating a single interface for file I/O and network communication, the method comprising:

receiving, by a content producing device from a local application, a first command to create content, wherein the first command includes a name for the content and access control information that indicates how the content may be accessed, wherein the content name is a hierarchically structured variable length identifier that includes contiguous name components ordered from a most general level to a most specific level;

creating a first manifest which is a content object that indicates a set of member content objects by a name and a digest, wherein a name for the first manifest is the content name corresponding to the first command, wherein access to the manifest is based on the access control information included in the first command; and transmitting to the local application the first manifest and an indicator of success for creating the first manifest, thereby facilitating an interface for the local application to process network data in a content centric network;

wherein the method is performed by a component that serves as an interface between the local application and a portal instance associated with a transport stack, and wherein the component, the local application, and the transport stack reside on the content producing device.

11. The method of claim 10, further comprising:

receiving from the local application a second command to update the content with new data, wherein the second command includes the first manifest name or a name of a member content object as indicated in the first manifest, a buffer which contains the new data for the update, a count for subsequent use in indicating a successful update, and an offset within the first manifest or within the member content object from which the new data is to be written;

updating the first manifest or the member content object by writing the new data in the buffer to the first manifest or the member content object starting from the offset; and returning the count to the local application.

12. The method of claim 10, further comprising:

storing the first manifest and the member content objects in a local cache or a storage device accessible to content producing device.

13. The method of claim 10, further comprising:

receiving from the local application a third command to delete the content, wherein the third command includes the first manifest name or the name of the member content object to be deleted;

deleting the first manifest or the member content object from a local cache or a storage device accessible by the content producing device; and transmitting to the local application an indicator of success for deleting the content.

14. The method of claim 10, further comprising:

receiving a fourth command to read content, wherein the fourth command includes a second content name that is a hierarchically structured variable length identifier that includes contiguous name components ordered from a most general level to a most specific level, a number of bytes of data to read, and an offset from which the data is to be read;

in response to determining that the content is available in a local cache or a storage device accessible to the content producing device, transmitting the content to the local application; and in response to determining that the content is not available in the local cache or the storage device accessible to the content producing device:

generating an interest with a name that is the second content name, wherein the interest is transmitted to a remote device;

receiving a second manifest which is a content object that indicates a set of member content objects by a name and a digest, wherein a name for the second manifest is the second content name corresponding to the fourth command; and transmitting the second manifest to the local application.

15. The method of claim 14, wherein in response to determining that the content is not available in the local cache or the storage device accessible to the content producing device, the method further comprises:

generating a set of interests for the member content objects in the second manifest, wherein the interests include the names for the member content objects in the second manifest, wherein the interests are transmitted to the remote device;

receiving the corresponding member content objects; and transmitting the member content objects to the local application.

16. The method of claim 14, wherein a component associated with the remote device serves as an interface between a remote application and a portal instance associated with a transport stack of the remote device.

17. The method of claim 10, wherein the method further comprises:

in response to receiving a fifth command from the local application to create, update, or delete content based on a name for the content, generating an interest with the content name and a payload that includes a command to create, update, or delete content, wherein the payload further includes authentication information, wherein the interest is transmitted to a remote device and received by a remote component that serves as an interface between a remote application and a portal instance associated with a transport stack of the remote device, and wherein the authentication information is used by the remote component to:

authenticate the content producing device; and create, update, or delete the content based on the content name as indicated in the fifth command.

18. The method of claim 10, further comprising determining whether a requesting entity may access the content associated with the first manifest based on the access control information included in the first command and further based on one or more of:

a storage or media device accessible to the computer system;

a set of system permissions indicated in a data structure accessible to the computer system; a local keychain accessible to the computer system; and a third party service for providing identity-related data and verification.

19. A non-transitory computer readable storage media encoded with instructions that, when executed by a processor of a computer system that facilitates interface for file input/output and network communication, by performing operations comprising:

receiving, by a content producing device from a local application, a first command to create content, wherein the first command includes a name for the content and access control information that indicates how the content may be accessed, wherein the content name is a hierarchically structured variable length identifier that includes contiguous name components ordered from a most general level to a most specific level;

creating a first manifest which is a content object that indicates a set of member content objects by a name and a digest, wherein a name for the first manifest is the content name corresponding to the first command, wherein access to the manifest is based on the access control information included in the first command; and transmitting to the local application the first manifest and an indicator of success for creating the first manifest, thereby facilitating an interface for the local application to process network data in a content centric network;

wherein the computer system is a component that serves as an interface between the local application and a portal instance associated with a transport stack, and wherein the component, the local application, and the transport stack reside on a same computing device.

20. The non-transitory computer readable storage media of claim 19, further comprising instructions that cause the processor to perform operations including:

receiving from the local application a second command to update the content with new data, wherein the second command includes the first manifest name or a name of a member content object as indicated in the first manifest, a buffer which contains the new data for the update, a count for subsequent use in indicating a successful update, and an offset within the first manifest or within the member content object from which the new data is to be written;

updating the first manifest or the member content object by writing the new data in the buffer to the first manifest or the member content object starting from the offset; and returning the count to the local application.

* * * * *